US009552151B2

(12) United States Patent  
Ikeda et al.

(10) Patent No.: US 9,552,151 B2
(45) Date of Patent: Jan. 24, 2017

(54) INFORMATION PROCESSING APPARATUS AND STORAGE MEDIUM

(71) Applicant: SONY CORPORATION, Tokyo (JP)

(72) Inventors: Tetsuo Ikeda, Tokyo (JP); Daisuke Nagano, Kanagawa (JP); Daisuke Sato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 255 days.

(21) Appl. No.: 14/317,114

(22) Filed: Jun. 27, 2014

(65) Prior Publication Data

US 2015/0012862 A1 Jan. 8, 2015

(30) Foreign Application Priority Data

Jul. 5, 2013 (JP) ................. 2013-141991

(51) Int. Cl.
G06F 3/16 (2006.01)
G06F 3/0486 (2013.01)
G06F 3/0485 (2013.01)
G06F 3/0488 (2013.01)
G06F 17/24 (2006.01)
G06F 3/01 (2006.01)

(52) U.S. Cl.
CPC .......... *G06F 3/0486* (2013.01); *G06F 3/0485* (2013.01); *G06F 3/0488* (2013.01); *G06F 17/24* (2013.01); *G06F 17/243* (2013.01); G06F 2203/04808 (2013.01)

(58) Field of Classification Search
CPC ...... G06F 3/0486; G06F 3/0485; G06F 3/0488
See application file for complete search history.

(56) References Cited

U.S. PATENT DOCUMENTS

| 8,302,021 | B2* | 10/2012 | Dettinger et al. .... G06F 3/0486 715/769 |
| 2002/0186257 | A1* | 12/2002 | Cadiz et al. ...... G06F 17/30867 715/838 |
| 2006/0212806 | A1* | 9/2006 | Griffin et al. ......... G06F 17/218 715/206 |
| 2008/0109743 | A1* | 5/2008 | Gibson et al. ........ G06F 3/0486 715/769 |

FOREIGN PATENT DOCUMENTS

JP 2005-352730 A 12/2005

* cited by examiner

Primary Examiner — Nicholas Augustine
(74) Attorney, Agent, or Firm — Chip Law Group

(57) ABSTRACT

There is provided an information processing apparatus including an operation recognition unit configured to recognize a drag start area in a first application and a droppable area in a second application, the drag start area being an area where an drag operation is started, and the second application being different from the first application, a paste content processing unit configured to analyze attributes of the drag start area and the droppable area, and to determine a paste content in response to a comparison result between the respective attributes, and a paste execution unit configured to paste the paste content determined by the paste content processing unit, in the droppable area, when the operation recognition unit recognizes a drop operation in the droppable area.

16 Claims, 17 Drawing Sheets

FIG. 3
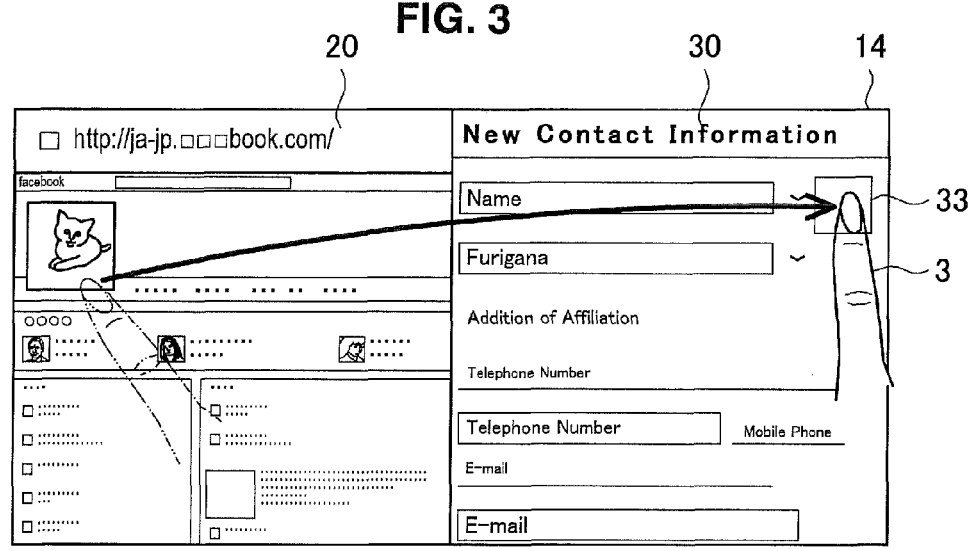
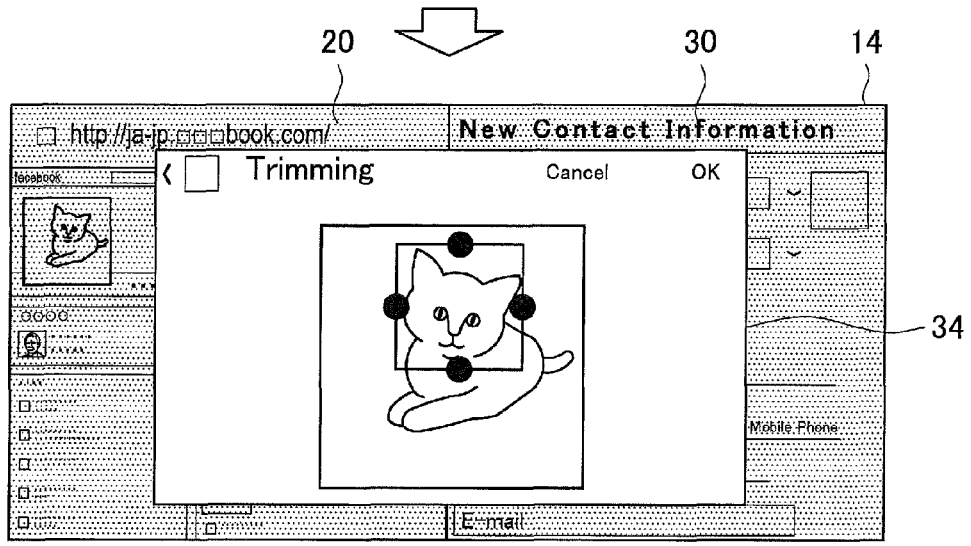
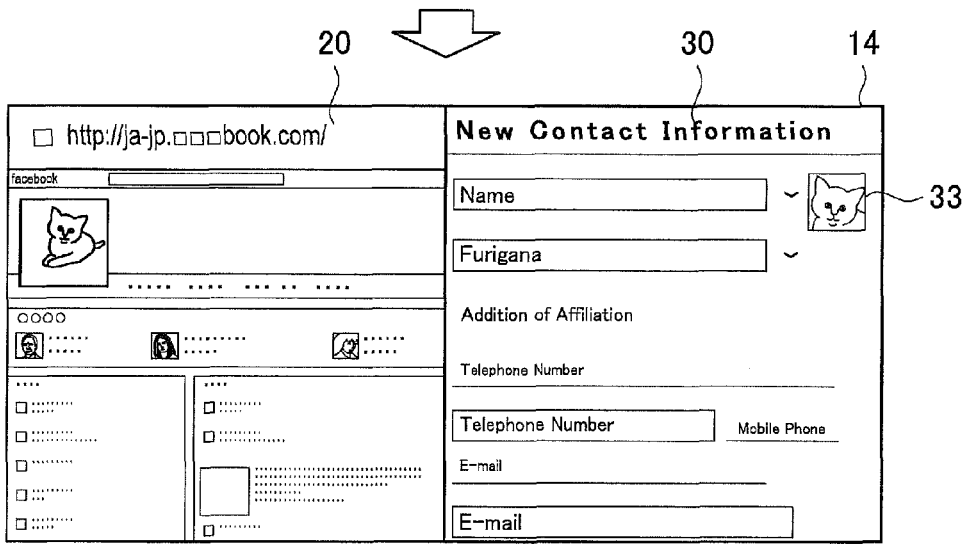

FIG. 5
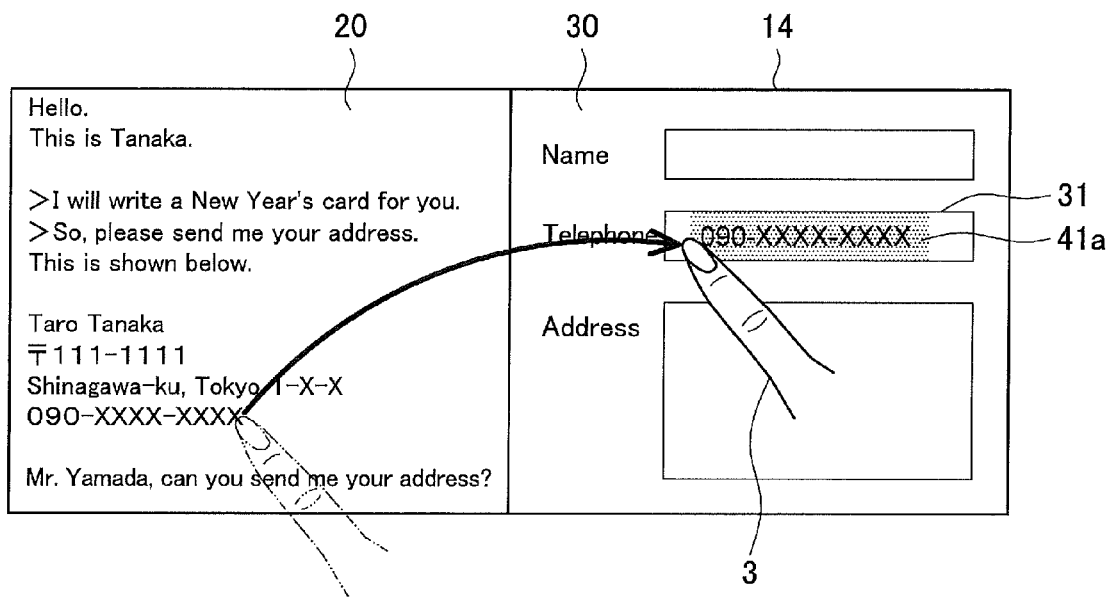
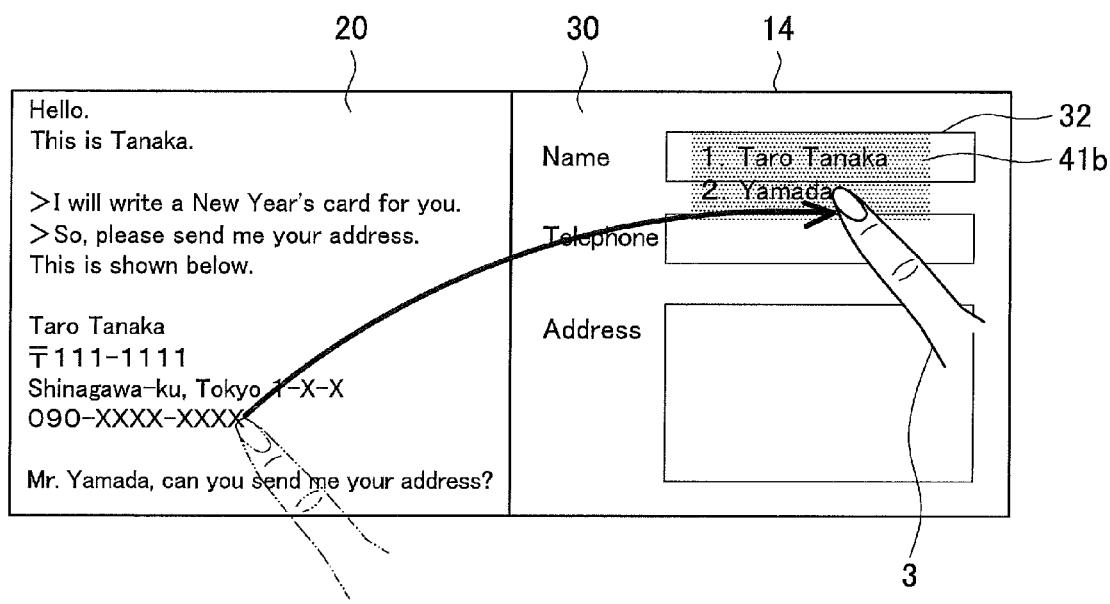

| DESCRIPTION | ATTRIBUTE |
|---|---|
| <input type="password"> | password |
| <input type="tel"> | telephone number |
| <input type="email"> | e-mail address |
| <img> | image |

201

| DESCRIPTION | ATTRIBUTE |
|---|---|
| <input type="text" istyle="3" /> | half-size alphabetic character (carrier X) |
| <input type="text" format="*N" /> | half-size numeric character (carrier Y) |
| <input type="text" mode="hiragana" /> | full-size hiragana (carrier Z) |

```
Name
<input type="text" value="">
```

211

```
<input type="text" value="Input a postal code">
```

212

```
<table>
<tr>
<td>Address</td>
<td><input type="text" value=""></td>
</tr>
</table>
```

FIG. 8

| DESCRIPTION | ATTRIBUTE |
|---|---|
| (0¥d[1,4]-\|(0¥d[1,4]¥) ?)?¥d[1,4]-¥d[4] | telephone number |
| ([a-zA-Z0-9])+([a-zA-Z0-9¥._-])*@([a-zA-Z0-9_-])+([a-zA-Z0-9¥._-]+)+ | e-mail address |
| http(s)?://([¥w-]+¥.)+[¥w-]+(/[¥w-./?%&=]*)? | URL |
| [0-9]{3}-?[0-9]{4} | postal code (Japan) |

FIG. 10B 20   30   14

| Received E-mail | |
|---|---|
| 🕐 2013/02/12 14:09:34 | |
| 👤 taro.yamada@xxxx.ne.jp | |
| TO ○○○○ | |
| ☐ Address has changed | |
| DECO 0.3Kbyte | |

It has been a long time.
This is Yamada.

I have changed my phone to a smart phone.
So, my contact information has changed.
090-XXXX-XXXX
taro.yamada@xxxx.ne.jp New Contact Information Name Furigana Addition of Affiliation Telephone Number Telephone Number  090-XXXX-XXXX  Mobile Phone E-mail E-mail 35b   3

ATTRIBUTE ACQUISITION AREA

It has been a long time.
This is Yamada.

I have changed my phone to a smart phone.
So, my contact information has changed.
090-XXXX-XXXX
taro.yamada@xxxx.ne.jp

┌─────────────────────────────────────┐ ┌─────────────────────────────────┐
│ Received E-mail                     │ │  New Contact Information        │
│ 🕐 2013/02/12 14:09:34              │ │                                 │
│ 👤 taro.yamada@xxxx.ne.jp           │ │  Name    Yamada          ─┐     │
│ TO OOOO                             │ │                                 │
│ ☐ Address has changed               │ │  Furigana                       │
│ DECO  0.3Kbyte                      │ │                                 │
│ It has been a long time.            │ │  Addition of Affiliation        │
│ This is Yamada.                     │ │                                 │
│                                     │ │  Telephone Number               │
│ I have changed my phone to a smart phone.                                │
│ So, my contact information has changed.│ Telephone Number  Mobile Phone │
│ 090-XXXX-XXXX                       │ │                                 │
│ taro.yamada@xxxx.ne.jp              │ │  E-mail                         │
│                                     │ │                                 │
│                                     │ │  E-mail                         │
└─────────────────────────────────────┘ └─────────────────────────────────┘
```

ATTRIBUTE ACQUISITION AREA

It has been a long time.
This is Yamada.

I have changed my phone to a smart phone.
So, my contact information has changed.
090-XXXX-XXXX
taro.yamada@xxxx.ne.jp

FIG. 11

FIG. 12
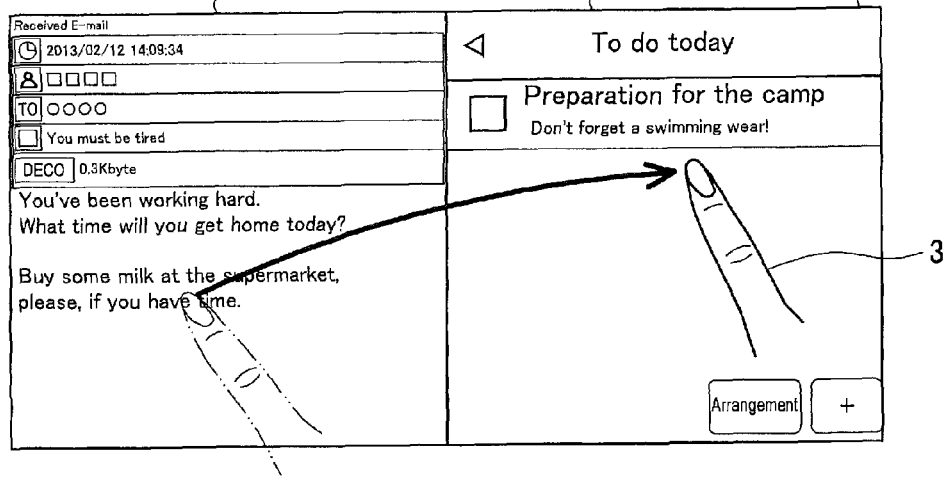
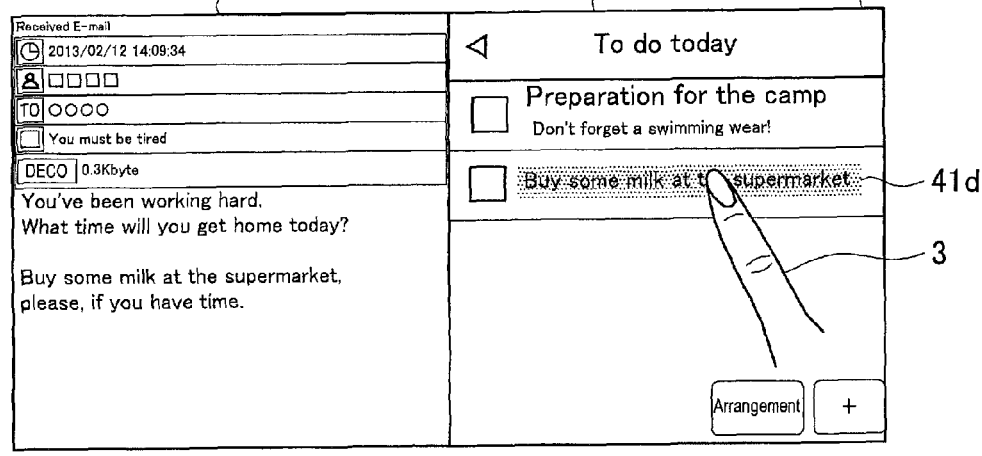
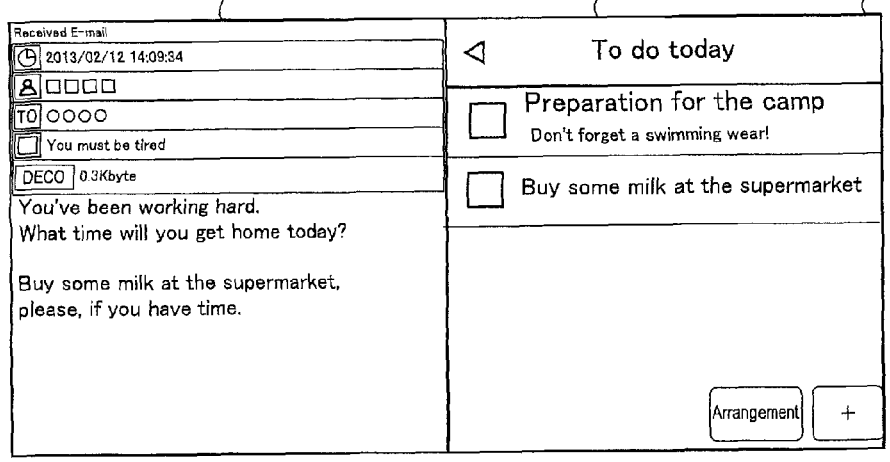

FIG. 15
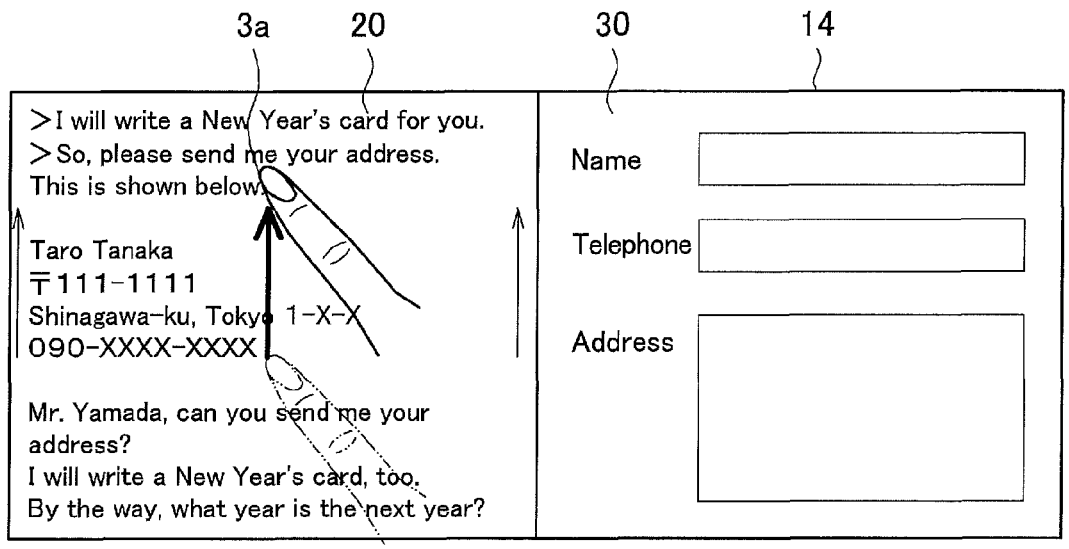
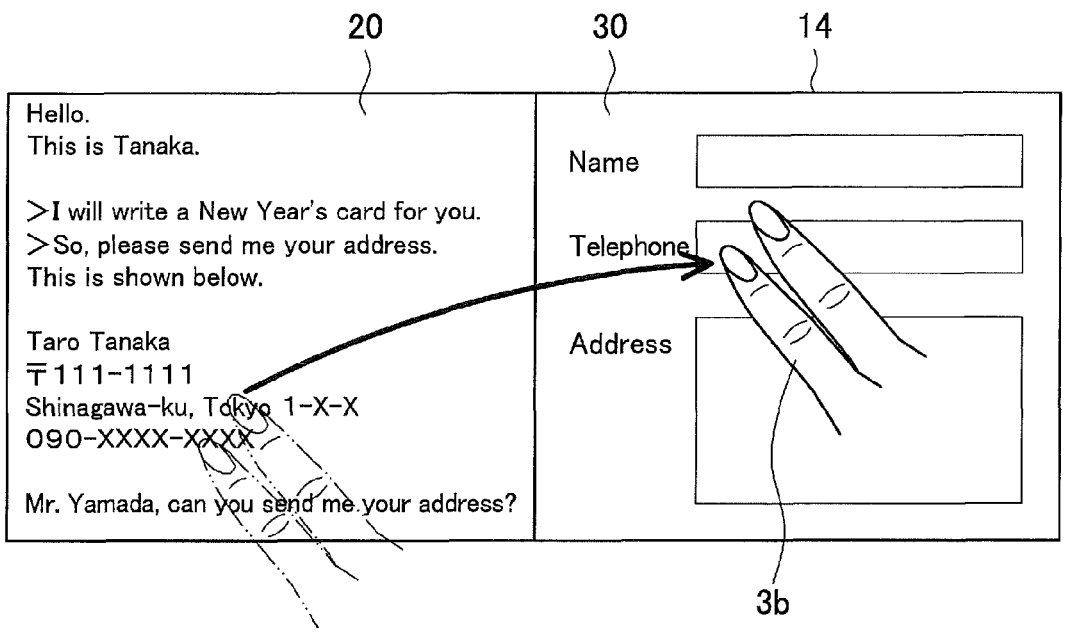

INFORMATION PROCESSING APPARATUS AND STORAGE MEDIUM

CROSS REFERENCE TO RELATED APPLICATIONS

This application claims the benefit of Japanese Priority Patent Application JP 2013-141991 filed Jul. 5, 2013, the entire contents of which are incorporated herein by reference.

BACKGROUND

The present disclosure relates to an information processing apparatus and a storage medium.

In related art, when performing a copy-paste between multiple application screens in an information processing apparatus such as a smart phone or a tablet terminal, it is necessary that a user specify a copy-intended range and perform a copy operation, and thereafter, it is necessary to call a paste-intended screen and perform a paste operation. The operation takes effort.

In response, in JP 2005-352730A, a function of analyzing a text selected by a user and automatically displaying candidates of an application to be processed is implemented. Thereby, it is possible to save the effort for the operation of calling a paste-intended screen (application).

SUMMARY

However, in the above JP 2005-352730A, the user's effort for the detailed work of selecting a text (selecting a copy range) is not saved still. Further, in the above JP 2005-352730A, a user has to perform a selection process for the displayed application candidates.

Hence, the present disclosure proposes an information processing apparatus and a storage medium that allow for a more efficient copy-paste between different screens.

According to an embodiment of the present disclosure, there is provided an information processing apparatus including an operation recognition unit configured to recognize a drag start area in a first application and a droppable area in a second application, the drag start area being an area where an drag operation is started, and the second application being different from the first application, a paste content processing unit configured to analyze attributes of the drag start area and the droppable area, and to determine a paste content in response to a comparison result between the respective attributes, and a paste execution unit configured to paste the paste content determined by the paste content processing unit, in the droppable area, when the operation recognition unit recognizes a drop operation in the droppable area.

According to an embodiment of the present disclosure, there is provided an information processing apparatus including an operation recognition unit configured to recognize a drag start area in a first application and a droppable area in a second application, and to output a recognition result to an external apparatus, the drag start area being an area where an drag operation is started, and the second application being different from the first application, and a paste execution unit configured to paste a paste content determined by the external apparatus, in the droppable area, when the external apparatus analyzes attributes of the drag start area and the droppable area and determines the paste content in the droppable area in response to a comparison result between the respective attributes, and the operation recognition unit recognizes a drop operation in the droppable area.

According to an embodiment of the present disclosure, there is provided a non-transitory computer-readable storage medium having a program stored therein, the program making a computer function as an operation recognition unit configured to recognize a drag start area in a first application and a droppable area in a second application, the drag start area being an area where an drag operation is started, and the second application being different from the first application, a paste content processing unit configured to analyze attributes of the drag start area and the droppable area, and to determine a paste content in response to a comparison result between the respective attributes, and a paste execution unit configured to paste the paste content determined by the paste content processing unit in the droppable area, when the operation recognition unit recognizes a drop operation in the droppable area.

According to an embodiment of the present disclosure, there is provided a non-transitory computer-readable storage medium having a program stored therein, the program making a computer function as an operation recognition unit configured to recognize a drag start area in a first application and a droppable area in a second application, and to output a recognition result to an external apparatus, the drag start area being an area where an drag operation is started, and the second application being different from the first application, and a paste execution unit configured to paste a paste content determined by the external apparatus, in the droppable area, when the external apparatus analyzes attributes of the drag start area and the droppable area and determines the paste content in the droppable area in response to a comparison result between the respective attributes, and the operation recognition unit recognizes a drop operation in the droppable area.

As explained above, the present disclosure allows for a more efficient copy-paste between different screens.

BRIEF DESCRIPTION OF THE DRAWINGS

FIG. 3 is a diagram for explaining a trimming modification process by a modification processing unit according to the embodiment;

FIG. 5 is a diagram for explaining a feedback of a preview image of a paste content according to the embodiment;

FIG. 6 is a diagram showing a table that indicates examples of definitions of input character types to be referred to in an attribute analysis processing method 1 according to the embodiment;

FIG. 7 is a diagram for explaining an attribute analysis processing method 2 according to the embodiment;

FIG. 8 is a diagram showing a table 220 that indicates examples of definitions of regular expressions of character strings to be referred to in an attribute analysis processing method 3 according to the embodiment;

FIG. 10B is a diagram for explaining a case of extending the drag start area;

FIG. 10C is a diagram for explaining a case of extending the drag start area;

FIG. 11 is a diagram for explaining an example of a copy-paste execution from an address book to a web browser;

FIG. 12 is a diagram for explaining an example of a copy-paste execution from a mailer to a todo list;

FIG. 15 is a diagram for explaining the discrimination of drag operations according to the embodiment;

DETAILED DESCRIPTION OF THE EMBODIMENT(S)

Figure 1:
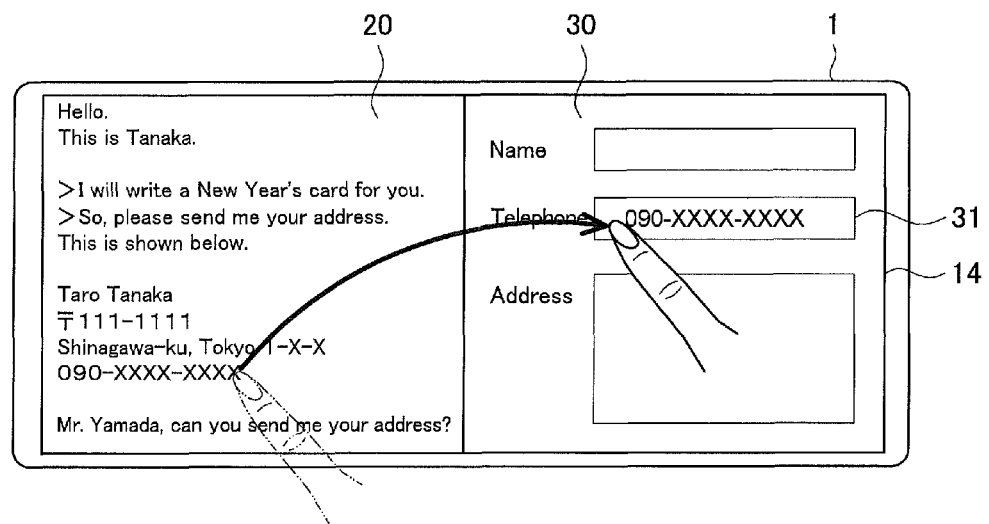
FIG. 1 is a diagram for explaining the outline of an information processing apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Outline of an information processing apparatus according to an embodiment of the present disclosure
2. Functional configuration
   2-1. Each configuration
   2-2. Attribute analysis processing method
3. Operation process
4. Paste execution examples
   4-1. Paste from an address book to a web browser
   4-2. Paste from a mailer to a todo list
   4-3. Paste from a web browser to a mailer
5. Supplement
   5-1. Discrimination of drag operations
   5-2. Hardware configuration
   5-3. Cloud-adaptive type
6. Conclusion

1. Outline of an Information Processing Apparatus According to an Embodiment of the Present Disclosure First, the outline of an information processing apparatus according to an embodiment of the present disclosure will be explained with reference to FIG. 1. As shown in FIG. 1, in an information processing apparatus 1 according to the embodiment, a display unit 14 is provided on one surface. The aspect ratio of the display unit 14 is not particularly limited, and may be 3:1, for example. Further, the information processing apparatus 1 according to the embodiment may be a mobile terminal such as a tablet terminal or a smart phone, for example.

On the display unit 14, multiple different application screens can be displayed in parallel. Concretely, as shown in FIG. 1, a screen of a mail application is deployed in a first display area 20 of the display unit 14, and a screen of an address book application is deployed in a second display area 30. Here, the screen ratio between the first display area 20 and the second display area 30 is not limited to 1:1 shown in FIG. 1, and may be 2:1 or the like. Further, the display unit 14 according to the embodiment has a touch sensor laminated thereon, and detects a user operation to the display screen.

Here, according to a method in related art, when a copy-paste of a text is performed between multiple screens, it is necessary to perform a transition to a selection mode, select a copy range by specifying a copy start position and an end position, and then perform a paste operation in a paste-intended location, and this takes effort.

Hence, the embodiment proposes the information processing apparatus 1 that determines a paste content in response to the comparison result between the respective attributes of a drag start area in the first screen and a droppable area in the second screen, and thereby allows for a more efficient copy-paste between the different screens.

In the example shown in FIG. 1, for example, when a part of a text displayed in the first display area 20 is copied and pasted in the second display area 30, a user, first, starts a drag operation with a finger 3 from the vicinity of a copy-intended text in the first display area 20. Then, the finger 3 is moved to a paste-intended location (for example, an input box 31) in the second display area 30, and a drop operation is performed.

On this occasion, the information processing apparatus 1 analyzes the attributes of the drag start area and droppable area, and determines a paste content in response to the comparison result between the respective attributes. Concretely, the information processing apparatus 1 analyzes a character string "090-XXXX-XXXX" in the vicinity of a location (drag start area) in the first display area 20 where the drag operation with the finger 3 is started, and thereby, can acquire an attribute "telephone number". Further, the information processing apparatus 1 analyzes the information that is expected for the input box 31 in the droppable area, to which the finger 3 is moved in the second display area 30, and thereby, can acquire the attribute "telephone number". The analysis processing method for an attribute by the information processing apparatus 1 will be described later, with reference to FIG. 6 to FIG. 8.

When the attributes of the drag start area and the droppable area agree with each other as the "telephone number", the information processing apparatus 1 determines the paste content as the character string "090-XXXX-XXXX", and performs a paste process to the input box 31 in the droppable area, as shown in FIG. 1.

Thus, according to the embodiment, it is not necessary to perform an operation of specifying a copy range, and an appropriate paste process is executed simply by performing a drag-drop operation from a screen on which a copy-intended character string or image is displayed, to a paste screen. Concretely, the information processing apparatus 1 performs such a process to paste data with an attribute that agrees with the attribute of the droppable area (paste screen).

So far, the outline of the information processing apparatus according to an embodiment of the present disclosure has been explained. Subsequently, a configuration and operation process of the information processing apparatus according to the present disclosure will be explained in order.

2. Functional Configuration

2-1. Each Configuration

Figure 2:
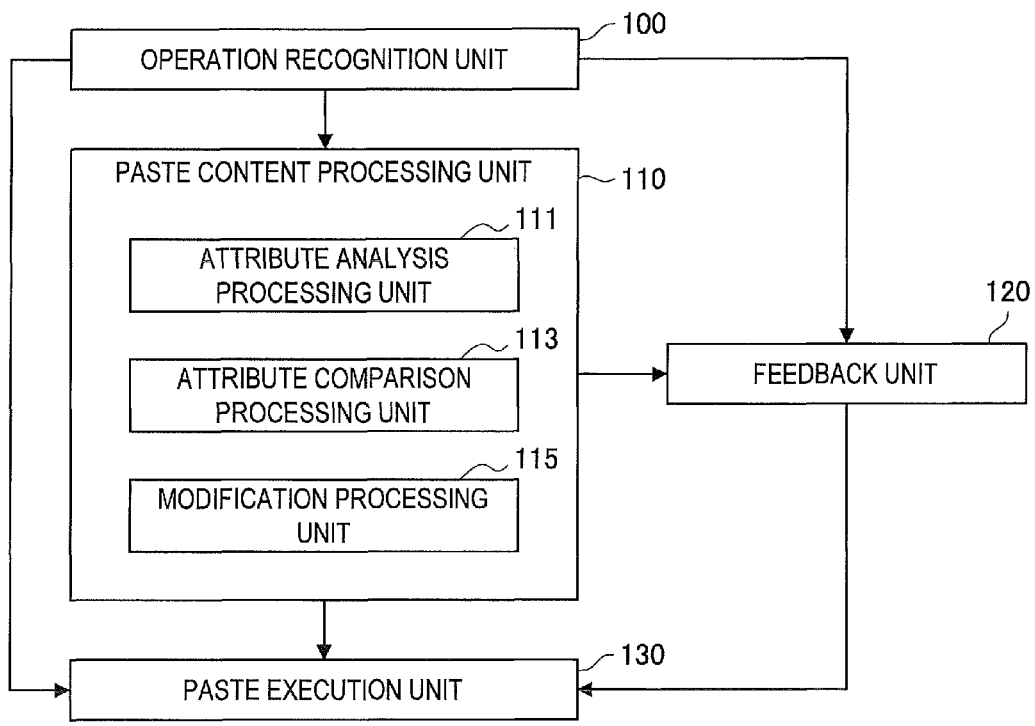
FIG. 2 is a diagram showing a functional configuration of the information processing apparatus according to the embodiment.

FIG. 2 is a diagram showing a functional configuration of the information processing apparatus 1 according to the embodiment. As shown in FIG. 2, the information processing apparatus 1 functions as an operation recognition unit 100, a paste content processing unit 110, a feedback unit 120, and a paste execution unit 130.

(Operation Recognition Unit)

The operation recognition unit 100 recognizes a user operation to the display screen, based on the press/release/move information from an input device such as the touch sensor laminated on the display unit 14. Concretely, the operation recognition unit 100 recognizes that a drag operation has been started, that an operating body (for example, the finger 3 of a user) has been moved to a droppable area, and that a drop operation has been completed. Further, the operation recognition unit 100 recognizes a drag start area in a first application (the screen of the first display area 20) where the drag operation is started, and a droppable area in a second application (the screen of the second display area 30) that is different from the first application.

(Paste Content Processing Unit)

The paste content processing unit 110 analyzes the attributes of the drag start area and the droppable area, and performs a process of determining a paste content in response to the comparison result between the respective attributes. Concretely, as shown in FIG. 2, the paste content processing unit 110 functions as an attribute analysis processing unit 111, an attribute comparison processing unit 113, and a modification processing unit 115.

The attribute analysis processing unit 111 performs a process of analyzing the attributes of the drag start area and the droppable area. The timing of analyzing the attributes of the drag start area and the droppable area is not particularly limited. For example, the attribute analysis processing unit 111 starts to analyze the attribute of the drag start area, when the operation recognition unit 100 recognizes that the drop operation has been performed in the droppable area. Further, the attribute analysis processing unit 111 analyzes the attribute of the droppable area, and thereby can decide what data can be pasted in the droppable area. Here, the droppable area means an area where some kind of data can be pasted. Concrete analysis processing methods for the attributes by the attribute analysis processing unit 111 will be explained in "2-2. Attribute analysis processing method" described later.

The attribute comparison processing unit 113 compares the attribute of the drag start area and the attribute of the droppable area, and decides whether they agree. By comparing the attributes of both, the attribute comparison processing unit 113 can judge whether data acquired from the drag start area are appropriate for the paste target. In the case where the attribute comparison processing unit 113 decides that the attributes agree, the paste content processing unit 110 determines the data acquired from the drag start area as the paste content. Here, data to be acquired from the drag start area is not limited to a text, and an image can be also acquired as a paste content. In the case where the attribute of the drag start area and the attribute of the droppable area do not agree, the paste content processing unit 110 can extend the drag start area to acquire attribute-agreement data. The extension of the drag start area will be described later, with reference to FIG. 10.

The modification processing unit 115 performs a modification process of the paste content, depending on the attribute of the droppable area. The process by the modification processing unit 115 is executed as necessary. For example, in the case where the attribute of the droppable area is "kana character" and the paste content contains a kanji character, the modification processing unit 115 performs a process of converting the kanji character contained in the paste content, into a "kana character". In the case where the attribute of the droppable area is "image" and a paste-possible size is prescribed, the modification processing unit 115 performs a process of trimming the paste content automatically/manually. In the following, the concrete explanation will be made with reference to FIG. 3.

FIG. 3 is a diagram for explaining a trimming modification process by the modification processing unit 115. As shown in the top of FIG. 3, a web browser is deployed in the first display area 20 of the display unit 14, and an address book is deployed in the second display area 30. In that situation, a user drags an image in the web browser with the finger 3 and drops it on an image box 33 in the address book. In this case, the attribute analysis processing unit 111 analyzes the attribute of data acquired from the drag start area and the attribute of the information that is expected in the droppable area, and then acquires an attribute "image" for both. Next, the attribute comparison processing unit 113 compares the attributes of both, and then decides that they agree as the "image". Then, the paste content processing unit 110 determines the image data acquired from the drag start area as the past content.

Here, in the case where the attribute analysis result for the image box 33 contains a "paste-possible size", the modification processing unit 115 performs a process of trimming-modifying the image data automatically or manually in accordance with the paste-possible size. In the case of being manual, for example, as shown in the middle of FIG. 3, the modification processing unit 115 opens a trimming dialog 34, and allows a user to set a trimming range manually. In the case where the modification processing unit 115 automatically performs the trimming, it is possible that the feedback unit 120 performs a preview display of the trimmed image data and thereby a user confirms it before the paste execution. When an OK button is pressed in the trimming dialog 34, or when the drop operation is performed, the image data trimmed by the modification processing unit 115 is pasted in the image box 33, as shown in the bottom of FIG. 3.

(Feedback Unit)

The feedback unit 120 generates at least one of an image indicating the drag start area and a preview image of the paste content, and displays it on the display unit 14 to perform a feedback process to a user. In the following, examples of the feedback according to the embodiment will be concretely explained with reference to FIG. 4 and FIG. 5.

Figure 4:
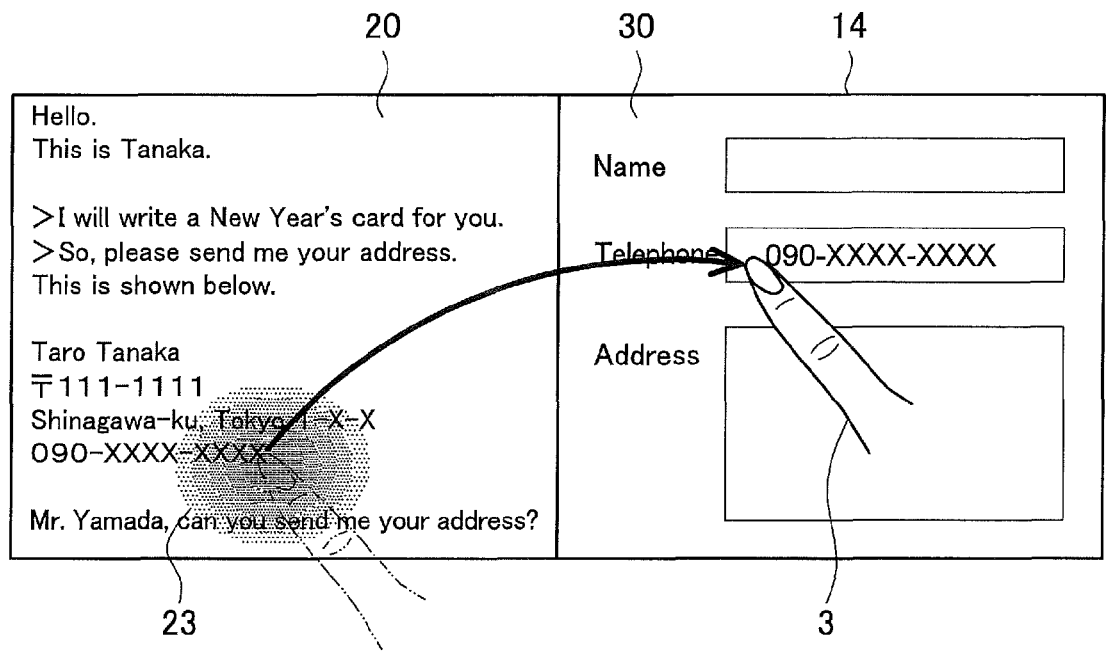
FIG. 4 is a diagram for explaining a feedback for a drag start area according to the embodiment.

FIG. 4 is a diagram for explaining a feedback for the drag start area by the feedback unit 120. As shown in FIG. 4, when a drag operation with the finger 3 is started in the first display area 20, the operation recognition unit 100 recognizes the start area for the drag operation. On this occasion, based on the recognition result by the operation recognition unit 100, the feedback unit 120 generates and displays a highlight image 23 for clearly showing the drag start area.

Thereby, a user can intuitively understand that the start of the drag operation has been normally recognized, and the location of the recognized drag start area.

FIG. 5 is a diagram for explaining a feedback of a preview image of a paste content by the feedback unit 120. As shown in the top of FIG. 5, when, by a drag operation, the finger 3 of a user is moved from the vicinity of the character string "090-XXXX-XXXX" in the first display area 20, to the input box 31 in the second display area 30, and is entered into the droppable area, the feedback unit 120 generates a preview image 41a indicating a determined paste content, and displays it in the input box 31.

If the paste content has no problem, the user releases the finger 3 from the display screen so that the drop operation is completed. When the operation recognition unit 100 recognizes the drop operation, the paste execution unit 130 executes a process of pasting the determined paste content in the input box 31. Thus, a user can confirm the paste content by the preview image 41a displayed before the paste execution.

In the case where multiple paste contents are determined, the paste execution unit 130 may generate and display a preview image 41b that contains multiple paste content candidates, as shown in the bottom of FIG. 5. In the example shown in the bottom of FIG. 5, a drag operation is started from the vicinity of the character string "090-XXXX-XXXX" in the first display area 20, and the finger 3 of a user is moved to an input box 32 in the second display area 30.

Here, the attribute of the input box 32 (droppable area) in the second display area 30 is analyzed as "name", and therefore, the decision that it does not agree with "telephone number" that is the attribute of the drag start area (character string "090-XXXX-XXXX") is made. Therefore, the paste content processing unit 110 extends the drag start area to acquire attribute-agreement data. The extension of the drag start area will be described later, with reference to FIG. 10.

The paste content processing unit 110 extends the drag start area (hereinafter, referred to as the attribute acquisition area, also) from the character string "090-XXXX-XXXX" both upwardly and downwardly, and thereby, as shown in the bottom of FIG. 5, can acquire character strings "Yamada" and "Taro Tanaka" whose attributes are analyzed as "name". Since the attributes of the character strings "Yamada" and "Taro Tanaka" both agree with the attribute of the droppable area, the paste content processing unit 110 determines these two data as the paste content.

Then, the feedback unit 120 generates the preview image 41b that indicates the multiple paste contents determined by the paste content processing unit 110, and displays it in the input box 32 as shown in the bottom of FIG. 5. A user selects an arbitrary paste content from the multiple paste content candidates contained in the preview image 41b, and releases the finger 3 from the selected candidate to complete the drop operation. Then, the paste execution unit 130 pastes the candidate selected by the user, in the input box 32.

So far, the process by the feedback unit 120 has been concretely explained. In the functional configuration of the information processing apparatus 1 according to the embodiment, the feedback unit 120 is not necessarily an indispensable constituent, and configurations with no feedback unit 120 also fall within the scope of the present disclosure.

(Paste Execution Unit)

When the operation recognition unit 100 recognizes the drop operation in the droppable area, the paste execution unit 130 performs a process of pasting the paste content determined by the paste content processing unit 110, in the droppable area.

So far, the functional configuration of the information processing apparatus 1 according to the embodiment has been explained. Subsequently, attribute analysis processing methods by the attribute analysis processing unit 111 that are included in the functional configuration of the information processing apparatus 1 will be concretely explained.

2-2. Attribute Analysis Processing Method

As described above, the attribute analysis processing unit 111 performs the process of analyzing the attribute of the drag start area and the attribute of the droppable area. The analysis method for the attribute is not particularly limited, and for example, methods to be explained below with reference to FIG. 6 to FIG. 8 are used.

2-2-1. Attribute Analysis Processing Method 1

First, as an attribute analysis processing method 1, there is a method of acquiring the attribute of a screen area. That is, in the case where a content creator previously prescribes an attribute in a screen area, the attribute analysis processing unit 111 can acquire the attribute with no change. Here, as examples of the attribute prescribed in the screen area, FIG. 6 illustrates tables 200, 201 indicating definitions of input character types.

The table 200 shown in FIG. 6 indicates examples of definitions of HTML-5 character types, which configure a web page intended to be browsed with a PC (personal computer) or a smart phone. For example, in the case where 'input type="password"' is prescribed in the screen area of the drag start area/droppable area, the attribute analysis processing unit 111, which refers to those definitions of the character types, can acquire the attribute as "password" with no change. In the case where 'input type="tel"' is prescribed in the screen area, the attribute analysis processing unit 111 can acquire the attribute as "telephone number" with no change. In the case where 'input type="email"' is prescribed in the screen area, the attribute analysis processing unit 111 can acquire the attribute as "e-mail address" with no change. In the case where "img" is prescribed in the screen area, the attribute analysis processing unit 111 can acquire the attribute as "image" with no change.

The table 201 shown in FIG. 6 indicates, for each carrier, an example of a definition of a character type, which configures a web page intended to be browsed with a mobile phone terminal Thereby, for example, in the case where 'input type="text" istyle="3"/' is prescribed in the screen area of the drag start area/droppable area, the attribute analysis processing unit 111, if a carrier X, can acquire the attribute as "half-size alphabetic character". In the case where 'input type="text" format="*N"/' is prescribed in the screen area, the attribute analysis processing unit 111, if a carrier Y, can acquire the attribute as "half-size numeric character". In the case where 'input type="text" mode="hiragana"/' is prescribed in the screen area, the attribute analysis processing unit 111, if a carrier Z, can acquire the attribute as "full-size hiragana".

Thus, the attribute analysis processing unit 111 refers to program descriptions configuring a web page, and thereby, can acquire, with no change, an attribute that is previously prescribed in the screen area. Here, the descriptions in HTML are used as examples, but for example, input character prescriptions in a programming language can be handled similarly.

2-2-2. Attribute Analysis Processing Method 2

Next, an attribute analysis processing method in the case where the attribute is not previously set in the screen area will be explained. In this case, according to the above described attribute analysis processing method 1, it is difficult to acquire the attribute. Therefore, the attribute analysis processing unit 111 analyzes the structure of the screen area, and thereby acquires the attribute. In the following, a method of acquiring the attribute by analyzing the structure of the screen area (an attribute analysis processing method 2) will be explained with reference to FIG. 7.

FIG. 7 is a diagram for explaining the attribute analysis processing method 2. FIG. 7 shows HTML descriptions 210, 211, 212 in the screen area corresponding to the drag start area/droppable area in a web page. All the HTML descriptions 210, 211, 212 involve 'input type="text"', and therefore, by itself, it is unknown whether "text" is a name, an address, a telephone number or a postal code. Hence, the attribute analysis processing unit 111 analyzes the structure of the screen area, and thereby can acquire the attribute of a value that is expected in the screen area.

For example, in the description 210 shown in FIG. 7, by acquiring the periphery of the input tag in HTML, which contains a description "Name", it is found that the attribute of the information expected in this box is a name. Further, in the description 211 shown in FIG. 7, by acquiring the default value, in which "Input a postal code" is described, it is found that the attribute of the information expected in this box is a postal code. Further, in the description 212 shown in FIG. 7, a description "Address" is seen on a line in the same table structure, and therefore, it is found that the attribute of the information expected in this box is an address.

Thus, the attribute analysis processing unit 111 analyzes the structure of the screen area, and thereby can acquire the attribute even when the attribute is not explicitly defined.

2-2-3. Attribute Analysis Processing Method 3

Next, an attribute analysis processing method in the case where the attribute is not previously prescribed in the screen area and the screen area is a text area will be explained. In this case, the attribute analysis processing unit 111 can acquire the attribute by analyzing the text structure in the text area. In the following, an attribute analysis processing method 3 of acquiring the attribute by analyzing the text structure will be explained with reference to FIG. 8.

FIG. 8 illustrates a table 220 that indicates examples of definitions of regular expressions of character strings. In the case where the screen area of the drag start area/droppable area is a text area, the attribute analysis processing unit 111 performs a decision process of whether character strings in the text area match with the regular expressions indicated in the table 220, and thereby can acquire the attribute for each part of the character strings. Concretely, as shown in FIG. 8, it is possible to acquire the attributes of character strings for "telephone number", "e-mail address", "URL" and "postal code".

Besides this, the attribute analysis processing unit 111 can acquire the attribute for each part of the character strings, using a text mining by a natural language process.

So far, the process by the attribute analysis processing unit 111 according to the embodiment has been concretely explained. Subsequently, an operation process of the information processing apparatus 1 according to the embodiment will be explained with reference to FIG. 9.

3. Operation Process

Figure 9:
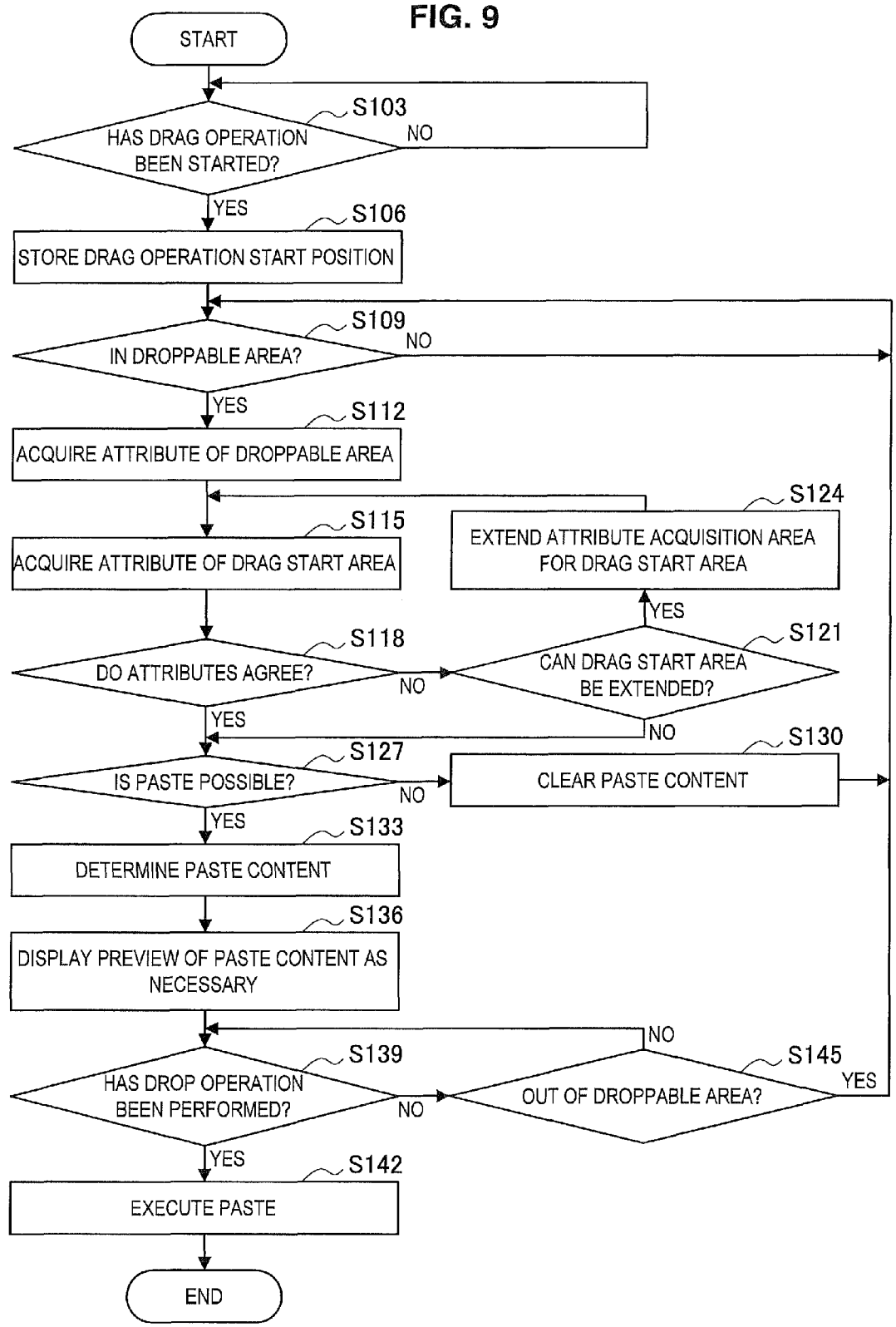
FIG. 9 is a flowchart showing an operation process of the information processing apparatus according to the embodiment.

FIG. 9 is a flowchart showing an operation process of the information processing apparatus 1 according to the embodiment. First, in step S103, the operation recognition unit 100 of the information processing apparatus 1 recognizes the start of a drag operation as shown in FIG. 9.

Next, when the start of the drag operation is recognized (S103/Yes), in step S106, the operation recognition unit 100 stores the start position (drag start area) of the drag operation. The start position of the drag operation is indicated by an x-y coordinate position.

Next, in step S109, the operation recognition unit 100 recognizes that the finger 3 of a user has been moved from the drag operation start position and entered into a droppable area. Concretely, for example, the operation recognition unit 100 recognizes that the finger 3 of a user has been entered into an area in which some kind of data can be pasted and that is within the screen (display area) of the second application different from the first application, from which the drag operation has been started.

Next, when recognizing that the finger 3 has been entered into the droppable area (S109/Yes), in step S112, the attribute analysis processing unit 111 of the paste content processing unit 110 acquires the attribute of the droppable area.

Next, in step S115, the attribute analysis processing unit 111 acquires the attribute of the drag start area.

Next, in step S118, the attribute comparison processing unit 113 compares the attribute of the droppable area with the attribute of the drag start area, and judges whether they agree.

Next, when the attributes of both do not agree (S118/No), in step S121, the paste content processing unit 110 judges whether the drag start area can be extended.

Next, when the drag start area can be extended (S121/Yes), in step S124, the paste content processing unit 110 extends the attribute acquisition area for the drag start area. The paste content processing unit 110 repeats the extension of the drag start area until the attribute agreeing with the attribute of the droppable area is acquired, or until the extension becomes difficult. Here, the extension of the drag start area is concretely explained with reference to FIG. 10A to FIG. 10D.

In examples shown in FIG. 10A to FIG. 10D, a mail application is deployed in the first display area 20, and an address book application is deployed in the second display area 30. Further, in the examples shown in FIG. 10A to FIG. 10D, a user starts the drag operation from the same location with the finger 3, and moves it to predetermined input boxes 35a to 35d in the second display area 30, respectively, to perform the drop operation. On this occasion, the paste content processing unit 110 extends the drag start area, in response to the comparison result between the attribute of the value expected in each of the input boxes 35a to 35d (that is, the attribute of the droppable area) and the attribute of the drag start area. The attribute of the drag start area and the attribute of the droppable area are acquired by the attribute analysis processing unit 111. Concretely, since the screen of the first display area 20 is a text area, the above described attribute analysis processing method 3 is used for the attribute analysis of the first display area 20, and since the screen of the second display area 30 is an input form area created by a program, the above described attribute analysis processing method 1 is used for the attribute analysis of the second display area 30.

Figure 10A:
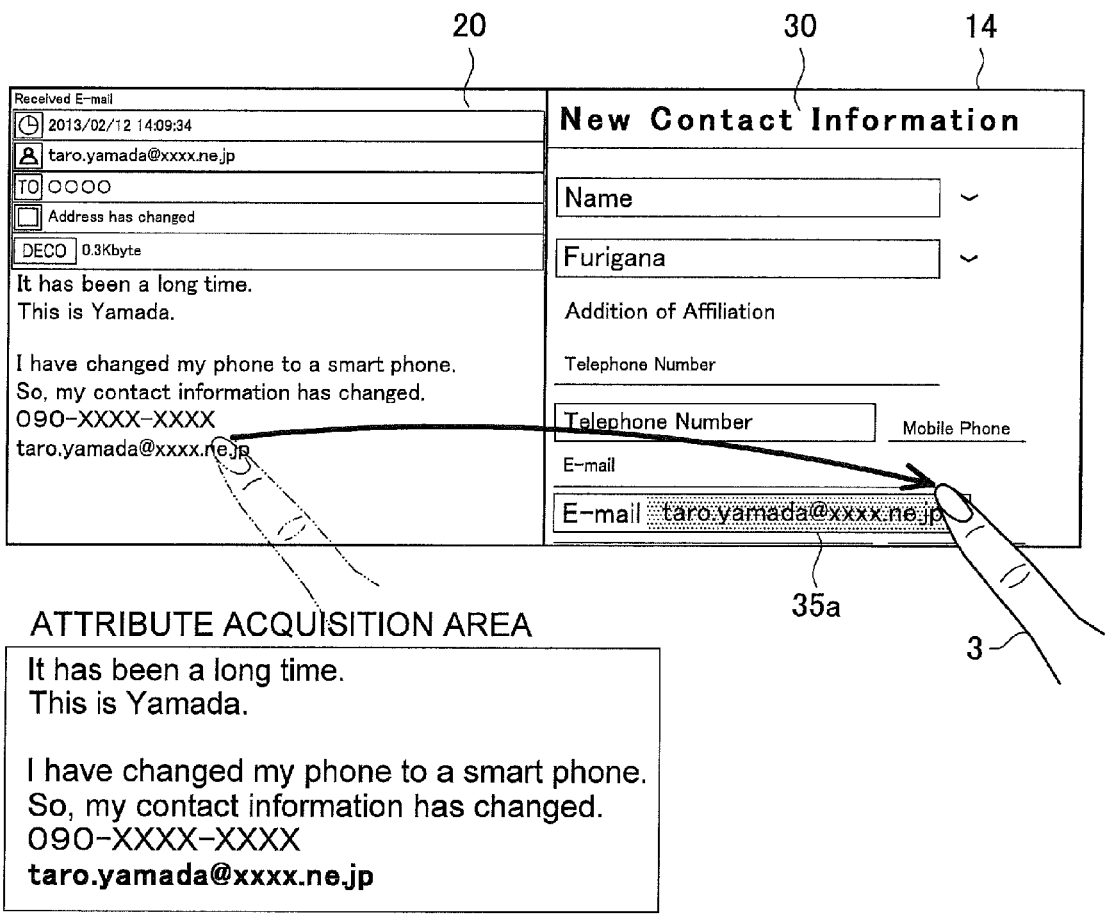
FIG. 10A is a diagram for explaining a case where the attribute of a drag start area agrees with the attribute of a droppable area.

First, the case where the attribute of the drag start area agrees with the attribute of the droppable area will be explained with reference to FIG. 10 A. In the example shown in FIG. 10A, the attribute acquisition area corresponding to the drag start area is only a character string "taro.yamada@XXX.ne.jp" of the text area in the first display area 20, and the attribute analysis processing unit 111 analyzes that the attribute is "e-mail address". On the other hand, the droppable area is the input box 35a in the second display area 30, and the attribute analysis processing unit 111 analyzes that the attribute is "e-mail address". In this case, since the attributes of both agree, the paste content processing unit 110 determines the character string "taro.yamada@XXX.ne.jp" that is acquired from the drag start area as the paste content, and, as shown in FIG. 10A, performs a preview display of the character string in the input box 35a. Then, when a user releases the finger 3 from the preview display, the paste execution unit 130 executes the paste of the character string.

Next, the case where the finger 3 is moved to the input box 35b will be explained with reference to FIG. 10B. For the input box 35b in the second display area 30, the attribute analysis processing unit 111 analyzes that the attribute is "telephone number". On the other hand, for the character string "taro.yamada@XXX.ne.jp" in the drag start area, the attribute is analyzed as "e-mail address", and therefore, the attribute comparison processing unit 113 judges that the attribute of the drag start area does not agree with the attribute of the droppable area. In this case, the paste content processing unit 110 extends the attribute acquisition area corresponding to the drag start area.

Concretely, as shown in FIG. 10B, the drag start area (attribute acquisition area) is extended from the character string "taro.yamada@XXX.ne.jp" to a character string "090-XXXX-XXXX" on the previous line. The attribute of the character string "090-XXXX-XXXX" is analyzed as "telephone number" by the attribute analysis processing unit 111, and therefore, agrees with the attribute of the droppable area. The paste content processing unit 110 determines the character string "090-XXXX-XXXX" as the paste content, and, as shown in FIG. 10B, makes the feedback unit 120 perform the preview display of the character string. When a user releases the finger 3 from the preview display, the paste execution unit 130 executes the paste of the character string.

The case where the finger 3 is moved to the input box 35c will be explained with reference to FIG. 10C. For the input box 35c in the second display area 30, the attribute analysis processing unit 111 analyzes that the attribute is "name". On the other hand, for the character string "taro.yamada@XXX.ne.jp" in the drag start area, the attribute is analyzed as "e-mail address", and therefore, the attribute comparison processing unit 113 judges that the attribute of the drag start area does not agree with the attribute of the droppable area. In this case, the paste content processing unit 110 sequentially extends the attribute acquisition area corresponding to the drag start area, and acquires data whose attribute agrees with the attribute of the droppable area, from the drag start area.

Concretely, as shown in FIG. 10C, the paste content processing unit 110 extends the attribute acquisition area corresponding to the drag start area, to a character string "This is Yamada", and thereby, can acquire a character string "Yamada" whose attribute is analyzed as "name". The paste content processing unit 110 determines the attribute-agreement character string "Yamada" as the paste content, and, as shown in FIG. 10C, makes the feedback unit 120 perform the preview display of the character string. When a user releases the finger 3 from the preview display, the paste execution unit 130 executes the paste of the character string.

Figure 10D:
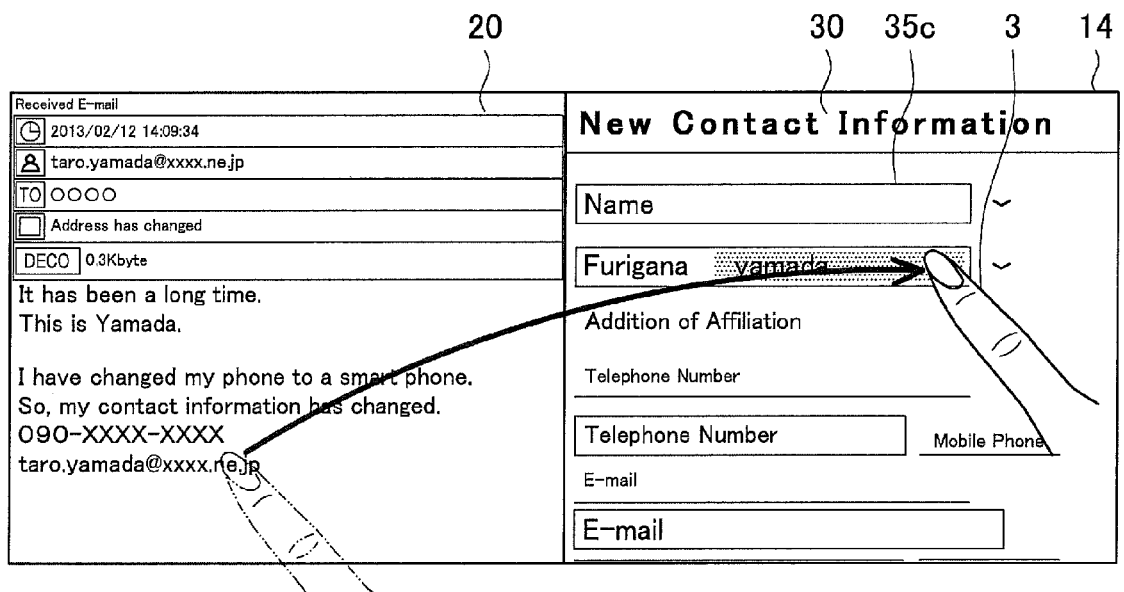
FIG. 10D is a diagram for explaining a case of extending the drag start area.

Next, the case where the finger 3 is moved to the input box 35d will be explained with reference to FIG. 10D. For the input box 35d in the second display area 30, the attribute analysis processing unit 111 analyzes that the attribute is "furigana of name". In this case, as shown in FIG. 10D, the paste content processing unit 110 extends the attribute acquisition area corresponding to the drag start area, to the character string "This is Yamada" whose attribute is analyzed as "name", and further determines a kana character into which the character string "Yamada" is converted by the modification processing unit 115 as the paste content. Then, as shown in FIG. 10D, the preview display of the character string is performed, and when a user releases the finger 3 from the preview display, the paste execution unit 130 executes the paste of the character string.

So far, the extension of the drag start area has been concretely explained. Next, going back to the flowchart in FIG. 9, the subsequent operation process will be explained from step S127.

When the attribute of the drag start area agrees with the attribute of the droppable area (S118/Yes), or when the extension of the drag start area is difficult (S121/No), in step S127, the paste content processing unit judges whether a paste-possible content has been acquired. For example, when the attribute of the drag start area agrees with the attribute of the droppable area, the judgment that a paste-possible content has been acquired is made. On the other hand, when the extension of the drag start area is difficult and an attribute-agreement content is failed to be acquired, the judgment that the paste is difficult is made. Here, even when an attribute-agreement content is failed to be acquired, if the attribute of the droppable area is a kind of text and the attribute of the drag start area is a kind of text, the paste content processing unit 110 may judge that the paste is possible.

Next, when the judgment that the paste is difficult is made (S127/No), in step S130, the paste content processing unit 110 clears the paste content.

On the other hand, when the judgment that the paste is possible is made (S127/Yes), in step S133, the paste content processing unit 110 determines the paste content. On this occasion, the modification processing unit 115 modifies the paste content as necessary.

Next, in step S136, the feedback unit 120 generates a preview image of the determined paste content as necessary, and displays it in the droppable area.

Next, in step S139, the paste execution unit 130 judges whether the operation recognition unit 100 has recognized an operation (drop operation) for releasing the finger 3 from the display screen.

When the drop operation has been recognized (S139/Yes), in step S142, the paste execution unit 130 executes the paste of the determined paste content.

On the other hand, when the drop operation is not recognized (S139/No), in step S145, the operation recognition unit 100 judges whether the finger 3 of a user has gone out of the droppable area.

When having gone out of the droppable area (S145/Yes), the above S109 to S139 are repeated. For example, when the finger 3 is moved to the input box 35a as shown in FIG. 10A and thereafter, apart from the input box 35a, the finger 3 is moved to the input box 35b as shown in FIG. 10B, the attribute of the input box 35b is acquired anew (S112), and the comparison process to the attribute of the drag start area is performed (S115, S118).

So far, the operation process of the information processing apparatus 1 according to the embodiment has been concretely explained. According to the embodiment, in response to the comparison result between the attributes of the drag start area and droppable area, the paste content is determined when the attributes agree. When the attributes do not agree, the drag start area is automatically extended, and thereby an attribute-agreement content can be acquired. Thereby, it is possible to save the effort for the detailed work of selecting a copy range of a paste content, and to perform the copy-paste between different screens, more efficiently.

4. Paste Execution Examples

Subsequently, paste execution examples according to the embodiment will be concretely explained with reference to FIG. 11 to FIG. 14.

4-1. Paste from an Address Book to a Web Browser

FIG. 11 is a diagram for explaining an example of a copy-paste execution from an address book to a web browser. In an example shown in FIG. 11, an address book application is deployed in the first display area 20, and a web browser application is deployed in the second display area 30.

In this case, as shown in the top of FIG. 11, a user drags an arbitrary item (for example, "Name 4") with the finger 3 from the address book in the first display area 20, to move to an input box 36 in the second display area 30, and thereby, can paste the arbitrary data in the address book, to the web browser. On this occasion, the paste content processing unit 110 analyzes the attribute of the drag start area and the attribute of the droppable area to perform the comparison process, and determines the paste content. Here, the attribute analysis processing method 1 of analyzing attributes previously prescribed by the program is used for the attribute analysis of the first display area 20, and the attribute analysis processing method 2 of analyzing the structure of the screen area and acquiring the attribute is used for the attribute analysis of the second display area 30, in which attributes are not previously prescribed by the program.

When the finger 3, with which a drag operation is started in the first display area 20, is moved to the input box 36 that is a droppable area in the second display area 30, the attribute analysis processing unit 111 of the paste content processing unit 110 analyzes the attribute of the droppable area. Here, using the attribute analysis processing method 2, the attribute analysis processing unit 111 can analyze that the attribute of the droppable area is "telephone number", based on a character string "Phone".

Next, the attribute analysis processing unit 111 analyzes the attribute of the drag start area. Concretely, the attribute analysis processing unit 111 analyzes the address data of "Name 4" that are linked with "Name 4" in the first display area 20 as the drag start area. From the above address data, the paste content processing unit 110 acquires data prescribed as an attribute "telephone number", which is the same attribute as the droppable area. Then, the paste content processing unit 110 determines the paste content as the data with the same attribute as the attribute of the droppable area, and the paste execution unit 130 pastes the determined data in the droppable area.

Here, in the case where the locale of the web browser that is the droppable area is different from the locale of the information processing apparatus 1 (for example, in the case where the locale of the information processing apparatus 1 is Japan and the locale of the web browser is a country other than Japan), the paste content can be modified to data appropriate for the locale of the web browser by the modification processing unit 115. For example, when the paste content is a telephone number, the modification processing unit 115 modifies the telephone number of the paste content to the international telephone number, because the locale of the web browser is a country other than Japan. Then, as shown in the middle of FIG. 11, the feedback unit 120 displays a preview image 41c containing the before-modification data "090-XXXX-XXXX" and the after-modification data "+81-90-XXXX-XXXX", in the input box 36. A user moves the finger 3 to any one of the paste content candidates presented in the preview image 41c, and then releases it therefrom to perform the drop operation. Thereby, as shown in the bottom of FIG. 11, the paste content is pasted in the input box 36.

As explained above, when an item in the address book is pasted to an input form in the web browser, appropriate data corresponding to the attribute of the paste-possible area (the attribute of data that are expected in each input box) is acquired from the address book data, and is pasted to the input form in the web browser.

4-2. Paste from a Mailer to a Todo List

Next, another copy-paste execution example will be explained with reference to FIG. 12. FIG. 12 is a diagram for explaining a copy-paste execution example from a mailer to a todo list. In the example shown in FIG. 12, a mail application (referred to as a mailer, also) is deployed in the first display area 20, and a todo list application is deployed in the second display area 30. An operation for pasting the content of an e-mail as an item of a todo list in this case will be explained. Here, for the first display area 20, the attribute analysis processing method 3 is used because of a text area, and for the second display area 30, the attribute analysis processing method 1 is used because the attributes are previously prescribed by the program.

As shown in the top of FIG. 12, a user starts a drag operation with the finger 3 from the vicinity of a character string that is intended to be pasted to the todo list, and moves the finger 3 to a space of the screen of the todo list in the second display area 30. In response to this operation, the attribute analysis processing unit 111 of the paste content processing unit 110 analyzes the attribute of the paste-possible area and the attribute of the drag start area. Concretely, the attribute analysis processing unit 111 analyzes that the attribute of the todo list as the paste-possible area is "one-line text". Next, the paste content processing unit 110 acquires, from the drag start area, a character string whose attribute is analyzed as "one-line text" by the attribute analysis processing unit 111, and then determines the acquired character string as the paste content.

As shown in the middle of FIG. 12, by the determination of the paste content, a new todo list is generated by the todo list application that is deployed in the second display area 30, and the feedback unit 120 displays a preview image 41d of the paste content, in the new todo list.

Then, a user releases the finger 3 so that the drop operation is completed, and thereby, as shown in the bottom of FIG. 12, the paste content is pasted to the new todo list.

As explained above, when the content of an e-mail is pasted to a todo list, appropriate data corresponding to the attribute of the paste-possible area (the attribute of data that is expected in the todo list) is acquired from the body of the e-mail, and is pasted to the todo list. In the above described example, the paste example from the body of an e-mail to a todo list has been explained. However, the embodiment is not limited to the paste from the body of an e-mail, and a paste from another text area such as a memo screen or a schedule screen is similarly possible.

In the example shown in the top of FIG. 12, the drag operation is started from the character string part in the first display area 20. When a drag operation is started from a blank part, the paste content processing unit 110 extends the drag start area until the acquisition of a character string with the attribute "one-line text".

4-3. Paste from a Web Browser to a Mailer

Figure 13:
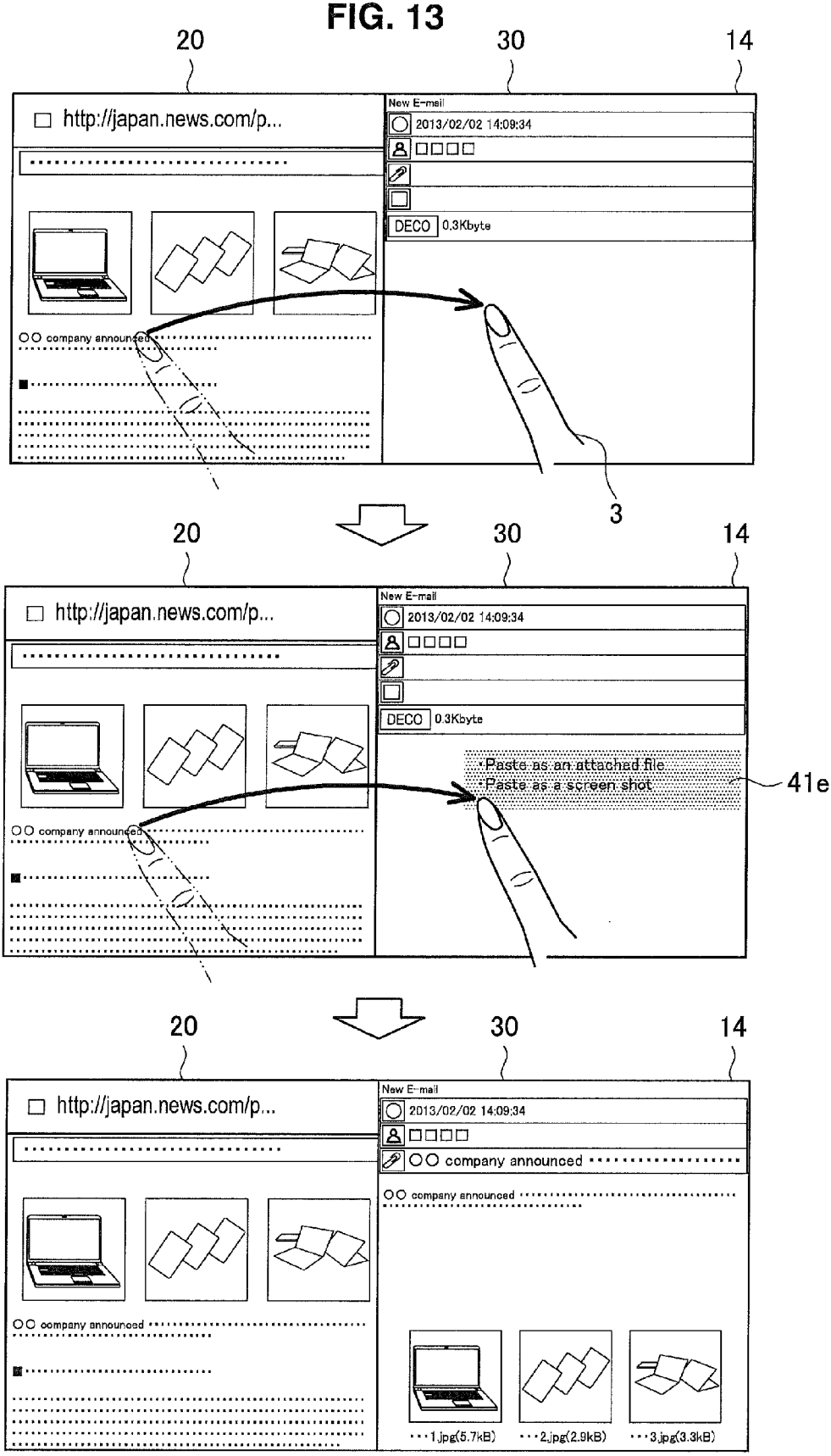
FIG. 13 is a diagram for explaining an example of a copy-paste execution from a web browser to a mailer.

Next, another copy-paste execution example will be explained with reference to FIG. 13. FIG. 13 is a diagram for explaining a copy-paste execution example from a web browser to a mailer. In the example shown in FIG. 13, a web browser is deployed in the first display area 20, and a mail application is deployed in the second display area 30. An operation for pasting a content of the web browser to a form of an e-mail in this case will be explained. Here, for the first display area 20, the attribute analysis processing method 2 is used because of a web page in which the detailed attributes of input boxes are not prescribed, and for the second display area 30, the attribute analysis processing method 1 is used because the attributes are previously prescribed by the program.

As shown in the top of FIG. 13, a user drags, with the finger 3, the body of the web browser deployed in the first display area 20, and moves it to the mailer in the second display area 30. In this case, the attribute analysis processing unit 111 of the paste content processing unit 110 analyzes the attribute of the paste-possible area and the attribute of the drag start area. Concretely, first, the attribute analysis processing unit 111 analyzes that the attribute of the mailer side as the paste-possible area is "attached file or screen shot". That is, the mailer side has a function of the paste as an attached file and a function of the paste as a screen shot. In this case, as shown in the middle of FIG. 13, the feedback unit 120 generates and displays a preview image 41e, and allows a user to select which function he utilizes.

Next, for example, the finger 3 of a user is moved to an item "Paste as an attached file" in the preview image 41e, and is released from the display screen so that the drop operation is completed. Thereby, the paste content processing unit 110 acquires the body and images in the drag start area as an attached file to determine the paste content. Then, as shown in the bottom of FIG. 13, the paste execution unit 130 pastes the attached file of the determined body and images to the e-mail. Here, the paste content processing unit 110 may determine a one-paragraph text in the drag start area, or a one-paragraph text and images displayed in the vicinity of the text as the paste content.

So far, the paste from the web browser to the mailer has been concretely explained. In the above described example, a user selects any one of the multiple paste functions. However, the embodiment is not limited to this, and it is possible to previously associate the multiple paste functions with the direction (attitude) of the information processing apparatus 1, respectively. In the following, the concrete explanation will be made with reference to FIG. 14A and FIG. 14B.

Figure 14A:
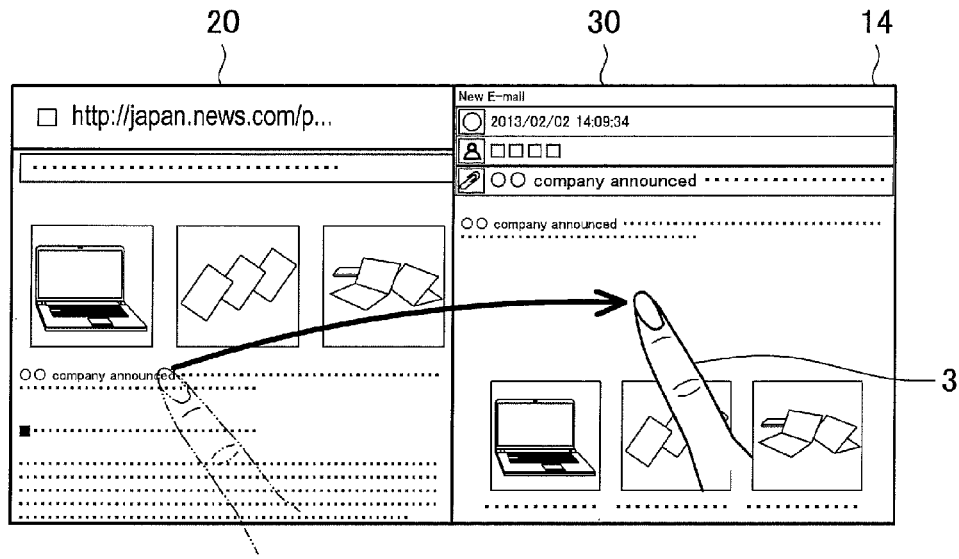
FIG. 14A is a diagram for explaining a paste function to be executed in the case where the information processing apparatus is in the lateral direction.

FIG. 14A is a diagram for explaining a paste function to be executed in the case where the information processing apparatus 1 is in the lateral direction. The direction of the information processing apparatus 1 is judged based on the information detected by a direction sensor (concretely, at least one of a gyro sensor and an acceleration sensor) that is provided in the information processing apparatus 1. In the specification, the lateral direction is the direction when the long side of the information processing apparatus 1 is horizontal as shown in FIG. 14A.

In the case where the information processing apparatus 1 is in the lateral direction, the previously set "paste function as an attached file" is executed, and when the body of the web browser is dragged and moved to the mailer side with the finger 3, the paste content processing unit 110 acquires the body and images of the web browser as an attached file. Then, when the drop operation is recognized in the mailer side (second display area 30), as shown in FIG. 14A, the paste execution unit 130 automatically pastes, as an attached file, the body and images of the web browser, to the e-mail.

Figure 14B:
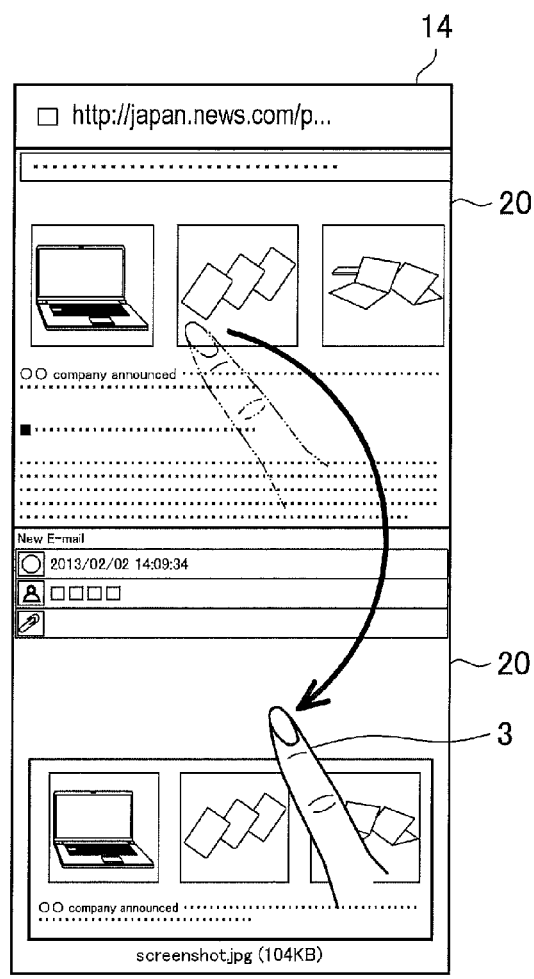
FIG. 14B is a diagram for explaining a paste function to be executed in the case where the information processing apparatus is in the longitudinal direction.

On the other hand, the case where the information processing apparatus 1 is in the longitudinal direction will be explained with reference to FIG. 14B. FIG. 14B is a diagram for explaining a paste function to be executed in the case where the information processing apparatus 1 is in the longitudinal direction. In the specification, the longitudinal direction is the direction when the short side of the information processing apparatus 1 is horizontal as shown in FIG. 14B.

In the case where the information processing apparatus 1 is in the longitudinal direction, the previously set "paste function as a screen shot" is executed, and when the body of the web browser is dragged and moved to the mailer side with the finger 3, the paste content processing unit 110 acquires the screen shot of the body and images of the web browser. Then, when the drop operation is recognized in the mailer side (second display area 30), as shown in FIG. 14B, the paste execution unit 130 automatically pastes the screen shot of the body and images of the web browser, to the e-mail.

So far, the case where the paste function is automatically selected in response to the direction of the information processing apparatus 1 has been explained. Thereby, it is possible to save user's effort for selecting the paste function. Here, the association of each paste function with the direction of the information processing apparatus 1 is not limited to the above described example. For example, in the case where the information processing apparatus 1 is in the lateral direction, the "paste function as a screen shot" may be executed, and in the case of being in the longitudinal direction, the "paste function as an attached file" may be executed.

5. Supplement

Figure 16:
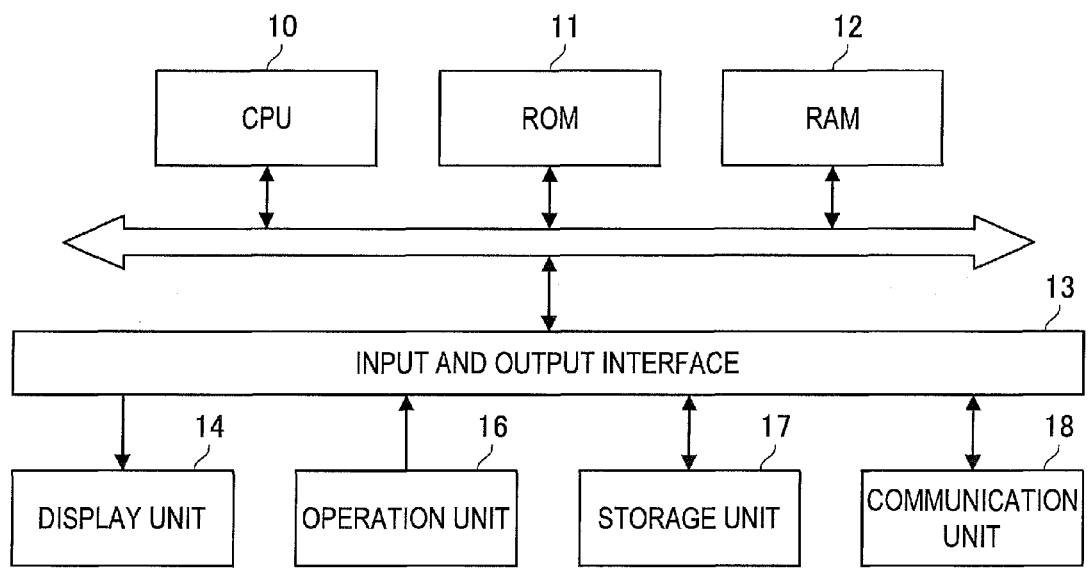
FIG. 16 is a block diagram showing an example of a hardware configuration of the information processing apparatus according to the embodiment.

Subsequently, supplements for the information processing apparatus 1 according to the embodiment will be explained with reference to FIG. 15 to FIG. 17.

5-1. Discrimination of Drag Operations

The operation recognition unit 100 of the information processing apparatus 1 according to the embodiment can recognize a drag operation for performing a copy-paste and a drag operation for performing a screen scrolling, while discriminating them.

An example of the discrimination of the drag operations according to the embodiment will be explained with reference to FIG. 15. FIG. 15 is a diagram for explaining a drag operation for performing a screen scrolling and a drag operation for performing a copy-paste. In an example shown in FIG. 15, a mailer is displayed in the first display area 20 of the display unit 14, and an address book is displayed in the second display area 30.

As shown in FIG. 15, by the number of fingers for performing a drag operation, the operation recognition unit 100 according to the embodiment discriminates whether the drag operation is a screen scrolling operation or a copy-paste operation. Concretely, for example, the operation recognition unit 100 recognizes that an ordinary drag operation performed with one finger 3a is a screen scrolling as shown in the top of FIG. 15, and recognizes that a drag operation performed with two fingers 3b is a copy-paste operation as shown in the bottom of FIG. 15. Here, the number of fingers can be judged based on the touch area or touch point number of the fingers to the display screen, which is found from the information detected by the touch sensor laminated on the display unit 14.

Alternatively, it is allowable that the operation recognition unit 100 recognizes that the ordinary drag operation is a screen scrolling, and recognizes that a drag operation performed after a long press is a copy-paste operation.

Thus, the information processing apparatus 1 according to the embodiment can implement the coexistent operation input with the existing drag operation, by the discrimination to the existing drag operation. Thereby, when a user performs a copy-paste, it is possible to save the effort for the transition from a screen scrolling mode to a paste mode.

Here, depending on the specification of an application, by displaying a button for the transition from the scrolling mode to the paste mode, the transition may be explicitly performed.

5-2. Hardware Configuration

Next, a hardware configuration of the above described information processing apparatus 1 according to the embodiment will be explained with reference to FIG. 16. FIG. 16 is a block diagram showing an example of a hardware configuration of the information processing apparatus 1 according to the embodiment. As shown in FIG. 16, the information processing apparatus 1 according to the embodiment includes a CPU (Central Processing Unit) 10, a ROM (Read Only Memory) 11, a RAM (Random Access Memory) 12, an input and output interface 13, the display unit 14, an operation unit 16, a storage unit 17 and a communication unit 18.

The CPU 10 executes various processes by programs stored in the ROM 11 or programs loaded from the storage unit 17 to the RAM 12. Concretely, the CPU 10 according to the embodiment executes the processes of the functional blocks shown in FIG. 2. In the RAM 12, data necessary for the execution of the various processes by the CPU 10, and the like are also stored appropriately. The CPU 10, the ROM 11 and the RAM 12 are connected with each other through a bus. With this bus, the input and output interface 13 is also connected.

The display unit 14, the operation unit 16, the storage unit 17 and the communication unit 18 are connected with the input and output interface 13. The input and output interface 13 mediates data that is input or output for these connected constituents, and data that is input or output through the bus for the CPU 10, the ROM 11 and the RAM 12. The constituents connected with the input and output interface 13 shown in FIG. 16 are just examples, and for example, a direction sensor (a gyro sensor, an acceleration sensor) and the like may be further connected.

The display unit 14 displays (plays back) various contents, a menu screen, an operation screen and the like, in accordance with the control by the CPU 10. The display unit 14 is implemented in an LCD (Liquid Crystal Display) or an OLED (Organic Light-Emitting Diode), for example. As shown in FIG. 1, the display unit 14 according to the embodiment can display multiple application screens in multiple display areas, in accordance with the control by the CPU 10.

The operation unit 16 has a function of receiving an operation input by a user. Concretely, the operation unit 16 may be implemented in, for example, a power switch or various operation buttons that are physically provided, or may be a position-detectable touch sensor that is unified with the display unit 14.

The storage unit 17 has a function of storing various contents such as e-mail data, address book data, todo list data, various applications, images (moving images, still images) and text files.

The communication unit 18 is connected with an external apparatus by wireless/wire, and has a function of performing the sending and receiving of data. For example, the communication unit 18 is connected with a wireless AP (access point) by a wireless LAN, infrared rays, Wi-Fi® or the like, and can be connected to a network through the wireless AP. Then, from a predetermined server on the network, the communication unit 18 can acquire display data for a web browser, and programs constituting the software for executing a series of processes according to the embodiment. The data acquired from the predetermined server on the network in this way is stored in the storage unit 17.

5-3. Cloud-Adaptive Type

In the above explained information processing apparatus 1 according to the embodiment, the CPU 10 of the information processing apparatus 1 implements the processes of the functional configuration shown in FIG. 2, and locally performs the processes. However, the information processing apparatus 1 according to the embodiment is not limited to this, and for example, the information processing apparatus 1 may be a cloud-adaptive type. In the following, the concrete explanation will be made with reference to FIG. 17.

Figure 17:
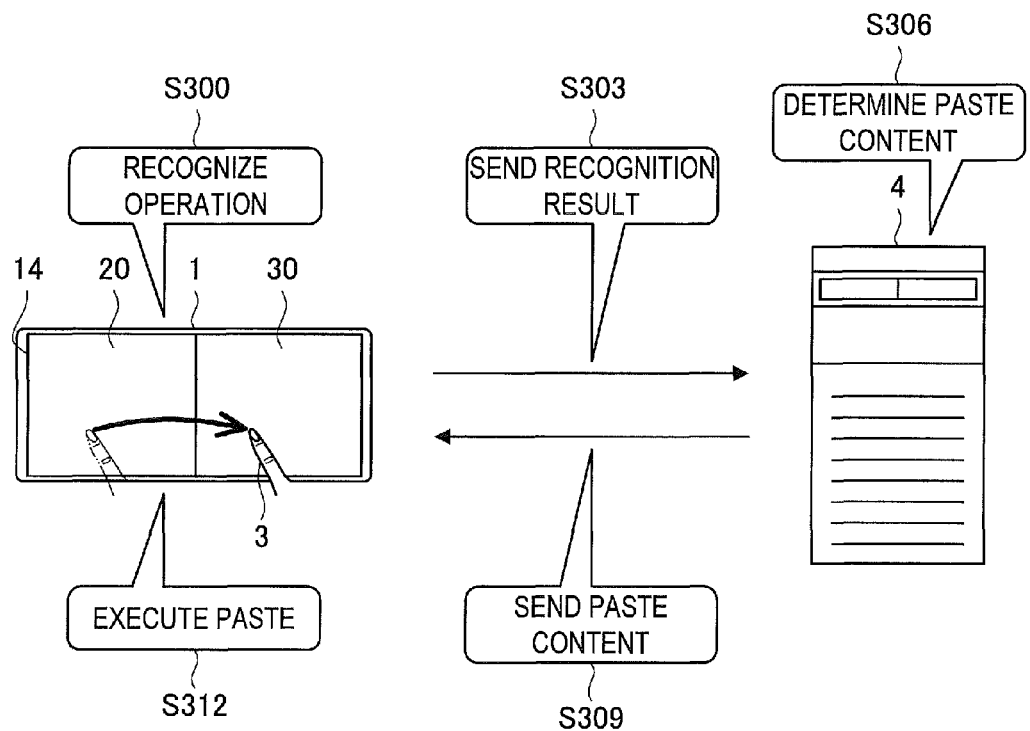
FIG. 17 is a diagram for explaining a cloud-adaptive information processing apparatus according to the embodiment.

FIG. 17 is a diagram for explaining a cloud-adaptive information processing apparatus 1. As shown in FIG. 17, the information processing apparatus 1 is connected with a server 4 (cloud) on a network, and performs the sending and receiving of data.

Concretely, the information processing apparatus 1 recognizes the drag start area in the first application that is deployed in the first display area 20 of the display unit 14, and the droppable area in the second application that is deployed in the second display area 30 (S300), and sends the recognition result to the server 4 (S303).

Next, the server 4 analyzes the attribute of the drag start area and the attribute of the droppable area to perform the comparison process between the respective attributes, and determines the content to be pasted in the droppable area, in response to the comparison result (S306). Here, in the above S303, the information necessary for the attribute analysis is also sent from the information processing apparatus 1. Further, the server 4 sends the determined paste content to the information processing apparatus 1 (S309). As necessary, the paste content can be modified depending on the attribute of the droppable area.

Then, when the drop operation is recognized in the droppable area, the information processing apparatus 1 pastes, in the droppable area, the paste content determined by the server 4 (S312).

Thus, in the information processing apparatus 1 according to the embodiment, the processes of the paste content processing unit 110 shown in FIG. 2 are performed mainly on the cloud side, and thereby it is possible to reduce the processing load of the information processing apparatus 1.

6. Conclusion

As described above, the information processing apparatus 1 according to the embodiment of the present disclosure determines the paste content, in response to the comparison result between the respective attributes of the drag start area in the first screen and the droppable area in the second screen, and thereby can perform the copy-paste between the different screens more efficiently.

Further, the information processing apparatus 1 according to the embodiment can modify the paste content to appropriate data, depending on the attribute of the droppable area.

Further, the information processing apparatus 1 according to the embodiment can display a preview image of the paste content to perform the feedback to a user.

It should be understood by those skilled in the art that various modifications, combinations, sub-combinations and alterations may occur depending on design requirements and other factors insofar as they are within the scope of the appended claims or the equivalents thereof.

For example, computer programs to fulfill the functions of the CPU 10 explained with reference to FIG. 2 can be made in the hardware incorporated in the information processing apparatus 1, such as the CPU 10, the ROM 11 or the RAM 12. Also, a computer-readable storage medium having the computer programs stored therein is provided.

Further, the steps for the process of the information processing apparatus 1 in the specification do not necessarily have to be processed in time series along the order disclosed in the appended flowchart. For example, the steps for the process of the information processing apparatus 1 may be processes in different order from the order described as the flowchart, or may be processed in parallel. Concretely, for example, steps S112 and S115 shown in FIG. 9 may be processed in parallel, or may be processed in the reverse order. Also, steps S133 and S136 shown in FIG. 9 may be processed in parallel, or may be processed in the reverse order.

Additionally, the present technology may also be configured as below:

(1) An information processing apparatus including:

an operation recognition unit configured to recognize a drag start area in a first application and a droppable area in a second application, the drag start area being an area where an drag operation is started, and the second application being different from the first application;

a paste content processing unit configured to analyze attributes of the drag start area and the droppable area, and to determine a paste content in response to a comparison result between the respective attributes; and a paste execution unit configured to paste the paste content determined by the paste content processing unit, in the droppable area, when the operation recognition unit recognizes a drop operation in the droppable area.

(2) The information processing apparatus according to (1), wherein the paste content processing unit starts to analyze the attribute of the drag start area, when the operation recognition unit recognizes an area where the drop operation is performed, as the droppable area.

(3) The information processing apparatus according to (1) or (2), wherein the operation recognition unit is capable of discriminating between a drag operation for a screen scrolling and a drag operation for a drag-drop.

(4) The information processing apparatus according to any one of (1) to (3), wherein, when the attribute of the drag start area agrees with the attribute of the droppable area as the comparison result, the paste content processing unit acquires a content agreeing with the attribute of the droppable area, from the drag start area, and reflects the acquired content to the paste content.

(5) The information processing apparatus according to any one of (1) to (4), wherein, when the attribute of the drag start area does not agree with the attribute of the droppable area as the comparison result, the paste content processing unit acquires a content agreeing with the attribute of the droppable area, by extending the drag start area, and reflects the acquired content to the paste content.

(6) The information processing apparatus according to any one of (1) to (5), wherein the paste content processing unit modifies the paste content in accordance with the attribute of the droppable area.

(7) The information processing apparatus according to any one of (1) to (6), further including a feedback generation unit to generate at least one of an image indicating the drag start area and a preview image of the paste content.

(8) The information processing apparatus according to any one of (1) to (7), wherein the paste content processing unit switches the paste content in response to an attitude of the information processing apparatus.

(9) An information processing apparatus including:

an operation recognition unit configured to recognize a drag start area in a first application and a droppable area in a second application, and to output a recognition result to an external apparatus, the drag start area being an area where an drag operation is started, and the second application being different from the first application; and a paste execution unit configured to paste a paste content determined by the external apparatus, in the droppable area, when the external apparatus analyzes attributes of the drag start area and the droppable area and determines the paste content in the droppable area in response to a comparison result between the respective attributes, and the operation recognition unit recognizes a drop operation in the droppable area.

(10) The information processing apparatus according to (9), wherein the operation recognition unit is capable of discriminating between a drag operation for a screen scrolling and a drag operation for a drag-drop.

(11) The information processing apparatus according to (9) or (10), further including a feedback generation unit to generate at least one of an image indicating the drag start area and a preview image of the paste content.

(12) A non-transitory computer-readable storage medium having a program stored therein, the program making a computer function as:

an operation recognition unit configured to recognize a drag start area in a first application and a droppable area in a second application, the drag start area being an area where an drag operation is started, and the second application being different from the first application;

a paste content processing unit configured to analyze attributes of the drag start area and the droppable area, and to determine a paste content in response to a comparison result between the respective attributes; and a paste execution unit configured to paste the paste content determined by the paste content processing unit in the droppable area, when the operation recognition unit recognizes a drop operation in the droppable area.

(13) A non-transitory computer-readable storage medium having a program stored therein, the program making a computer function as:

an operation recognition unit configured to recognize a drag start area in a first application and a droppable area in a second application, and to output a recognition result to an external apparatus, the drag start area being an area where an drag operation is started, and the second application being different from the first application; and a paste execution unit configured to paste a paste content determined by the external apparatus, in the droppable area, when the external apparatus analyzes attributes of the drag start area and the droppable area and determines the paste content in the droppable area in response to a comparison result between the respective attributes, and the operation recognition unit recognizes a drop operation in the droppable area.

What is claimed is:

1. An information processing apparatus, comprising:
   an operation recognition unit configured to recognize a drag start area in a first application and a droppable area in a second application, wherein the drag start area is an area where a drag operation is started, and wherein the second application is different from the first application;
   a paste content processing unit configured to:
      analyze an attribute of the drag start area and an attribute of the droppable area; and
      determine content to be pasted from the drag start area to the droppable area based on a result of a comparison between the attribute of the drag start area and the attribute of the droppable area; and
         a paste execution unit configured to paste the content determined by the paste content processing unit, in the droppable area, in an event the operation recognition unit recognizes a drop operation in the droppable area.

2. The information processing apparatus according to claim 1, wherein the paste content processing unit is configured to start analysis of the attribute of the drag start area, in an event the operation recognition unit recognizes an area where the drop operation is performed, as the droppable area.

3. The information processing apparatus according to claim 1, wherein the operation recognition unit is configured to discriminate between a drag operation for a screen scrolling and a drag operation for a drag-drop.

4. The information processing apparatus according to claim 1, wherein, in an event the result of the comparison indicates that the attribute of the drag start area agrees with the attribute of the droppable area, the paste content processing unit is configured to acquire, from the drag start area, a content agreeing with the attribute of the droppable area as the content to be pasted.

5. The information processing apparatus according to claim 1, wherein, in an event the result of the comparison indicates that the attribute of the drag start area disagrees with the attribute of the droppable area, the paste content processing unit is configured to extend the drag start area to acquire a content agreeing with the attribute of the droppable area as the content to be pasted.

6. The information processing apparatus according to claim 1, wherein the paste content processing unit is configured to modify the content to be pasted in accordance with the attribute of the droppable area.

7. The information processing apparatus according to claim 1, further comprising a feedback generation unit configured to generate at least one of an image that indicates the drag start area and a preview image of the content to be pasted.

8. The information processing apparatus according to claim 1, wherein the paste content processing unit is configured to switch the content to be pasted based on a direction of the information processing apparatus.

9. An information processing apparatus, comprising:
   an operation recognition unit configured to:
      recognize a drag start area in a first application and a droppable area in a second application; and
      output a recognition result to an external apparatus, wherein the drag start area is an area where a drag operation is started, and wherein the second application is different from the first application; and
   a paste execution unit configured to paste a content determined by the external apparatus, in the droppable area, in an event the external apparatus analyzes an attribute of the drag start area and an attribute of the droppable area and determines the content to be pasted in the droppable area based on a result of a comparison between the attribute of the drag start area and the attribute of the droppable area, and the operation recognition unit recognizes a drop operation in the droppable area.

10. The information processing apparatus according to claim 9, wherein the operation recognition unit is configured to discriminate between a drag operation for a screen scrolling and a drag operation for a drag-drop.

11. The information processing apparatus according to claim 9, further comprising a feedback generation unit configured to generate at least one of an image that indicates the drag start area and a preview image of the content.

12. A non-transitory computer-readable storage medium having a set of instructions stored therein, the set of instructions, in an event of execution by a computer, causes the computer to perform an operation, comprising:
    recognizing a drag start area in a first application and a droppable area in a second application, wherein the drag start area is an area where a drag operation is started, and wherein the second application is different from the first application;
    analyzing an attribute of the drag start area and an attribute of the droppable area;
    determining content to be pasted from the drag start area to the droppable area based on a result of a comparison between the attribute of the drag start area and the attribute of the droppable area; and
    pasting the determined content in the droppable area, in an event a drop operation in the droppable area is recognized.

13. A non-transitory computer-readable storage medium having a set of instructions stored therein, the set of instructions, in an event of execution by a computer, causes the computer to perform an operation, comprising:
    recognizing a drag start area in a first application and a droppable area in a second application;
    outputting a recognition result to an external apparatus, wherein the drag start area is an area where a drag operation is started, and wherein the second application is different from the first application; and pasting a content determined by the external apparatus, in the droppable area, in an event the external apparatus analyzes an attribute of the drag start area and an attribute of the droppable area and determines the content to be pasted in the droppable area based on a result of a comparison between the attribute of the drag start area and the attribute of the droppable area, and a drop operation in the droppable area is recognized.

14. The information processing apparatus according to claim 1, wherein the paste content processing unit is configured to acquire the attribute of the drag start area and the attribute of the droppable area based on a prescribed attribute of a screen area of the drag start area and a prescribed attribute of a screen area of the droppable area.

15. The information processing apparatus according to claim 1, wherein the paste content processing unit is configured to analyze a structure of a screen area of the drag start area and a structure of a screen area of the droppable area to acquire the attribute of the drag start area and the attribute of the droppable area.

16. The information processing apparatus according to claim 1, wherein in an event a screen area that corresponds to the drag start area and a screen area that corresponds to the droppable area is a text area, the paste content processing unit is configured to analyze text structure in the text area to acquire the attribute of the drag start area and the attribute of the droppable area.

* * * * *